United States Patent [19]

Harashima et al.

[11] Patent Number: 5,710,875
[45] Date of Patent: Jan. 20, 1998

[54] METHOD AND APPARATUS FOR PROCESSING 3-D MULTIPLE VIEW IMAGES FORMED OF A GROUP OF IMAGES OBTAINED BY VIEWING A 3-D OBJECT FROM A PLURALITY OF POSITIONS

[75] Inventors: Hiroshi Harashima; Robert Hsu; Kazuya Kodama, all of Kawasaki, Japan

[73] Assignee: Fujitsu Limited, Kawasaki, Japan

[21] Appl. No.: 400,756

[22] Filed: Mar. 8, 1995

[30] Foreign Application Priority Data

Sep. 9, 1994 [JP] Japan ................... 6-215523

[51] Int. Cl.$^6$ ............................................ G06T 7/00
[52] U.S. Cl. .................... 345/419; 345/427; 345/437
[58] Field of Search .............................. 395/119, 125, 395/127, 129, 133, 137, 138; 382/277, 278; 348/37, 39, 47, 48, 50; 356/376

[56] References Cited

U.S. PATENT DOCUMENTS

| | | | |
|---|---|---|---|
| 5,028,996 | 7/1991 | Takahashi et al. | 348/420 |
| 5,202,928 | 4/1993 | Tomita et al. | 382/154 |
| 5,249,035 | 9/1993 | Yamanaka | 356/376 |
| 5,307,151 | 4/1994 | Hof et al. | 356/376 |
| 5,390,024 | 2/1995 | Wright | 356/376 |
| 5,402,532 | 3/1995 | Epstein et al. | 395/122 |
| 5,444,478 | 8/1995 | Lelong et al. | 348/39 |
| 5,455,689 | 10/1995 | Taylor et al. | 358/450 |
| 5,475,422 | 12/1995 | Mori et al. | 348/48 |
| 5,525,883 | 6/1996 | Avitzour | 318/587 |
| 5,530,774 | 6/1996 | Fogel | 382/154 |
| 5,561,756 | 10/1996 | Miller et al. | 395/155 |
| 5,566,280 | 10/1996 | Fukui et al. | 395/119 |

OTHER PUBLICATIONS

Zheng, "Acquiring 3-D Models from Sequences of Contours", IEEE Transactions on Pattern Analysis and Machine Intelligence, vol. 16, No. 2, Feb. 1994, pp. 163–178.

Hsu et al., "View Interpolation Using Epipolar Plane Images", IEEE Image Processing 1994, pp. 745–749.

Tistarelli et al., "On the Advantages of Polar and Log–Polar Mapping for Direct Estimation of Time–to–impact from Optical Flow", IEEE Transactions on Pattern Analysis and Machine Intelligence, vol. 15, No. 4, Apr. 1993, pp. 401–410.

Hartley et al., "Computing Matched–epipolar Projections", Computer Vision and Pattern Recognition, 1993, pp. 549–555.

Hu et al., "Matching Point Features with Ordered Geometric, Rigidity, and Disparity Constraints", IEEE Transactions on Pattern Analysis and Machine Intelligence, vol. 16, No. 10, Oct. 1994, pp. 1041–1049.

(List continued on next page.)

*Primary Examiner*—Heather R. Herndon
*Assistant Examiner*—Stephen Hong
*Attorney, Agent, or Firm*—Staas & Halsey

[57] ABSTRACT

A system for processing 3-D multiple-view images which can render an image of a 3-D object as seen from any arbitrary viewpoint based on the 3-D multiple-view images, provided with an image acquisition unit for acquiring 3-D multiple-view images of a 3-D object as seen from a plurality of viewpoints, an image analysis unit for analyzing 3-D multiple-view images comprised of a plurality of images and finding the layered feature trajectory information comprised of trajectories linking identical points of the 3-D object, an image interpolation unit for rendering by interpolation an image of the 3-D object as seen from a specified (by user) viewpoint based on the layered feature trajectory information, an image compression unit for approximating the shape and color and texture information for the individual trajectories of the layered feature trajectory information for compression coding, a memory unit for storing the coded layered feature trajectory information, and an image reconstruction unit for reconstructing the coded layered feature trajectory information read from the memory unit to the original layered feature trajectory information and applying it to the image interpolation unit.

32 Claims, 25 Drawing Sheets

OTHER PUBLICATIONS

Shizawa, "Direct Estimation of Multiple Disparities for Transparent Multiple Surfaces in Binocular Stereo", IEEE Computer Vision International Conference, 1993, pp. 447–454.

Robert, "Relative 3D Positioning and 3D Convex Hull Computation from a Weakly Calibrated Stereo Pair", IEEE Computer Vision, 1993, pp. 540–544.

Vaillant et al., "Using Extremal Boundaries for 3–D Object Modeling", IEEE Transactions on Pattern Analysis and Machine Intelligence, vol. 14, No. 2, Feb. 1992, pp. 157–173.

Gokmen et al., "Edge Detection and Surface Reconstruction Using Refined Regularization", IEEE Transactions on Pattern Analysis and Machine Intelligence, vol. 15, No. 5, May 1993, pp. 492–499.

Ishiguro et al., "Analysis of Omni–Directional Views at Different Location", IEEE International Workshop on Intelligent Robot and Systems, 1990, pp. 659–664.

Chen et al., "View Interpolation for Image Synthesis," *Computer Graphics Proceedings,* Annual Conference Series, 1993, ACM–0–89791–601–8/93/008/0279, pp. 279–288.

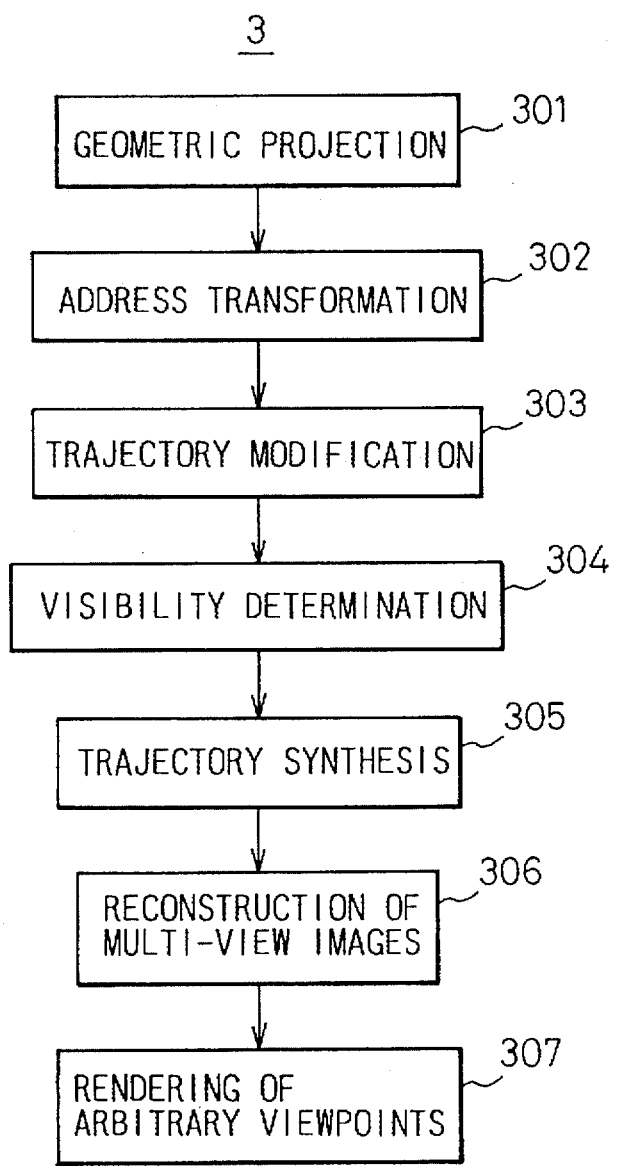

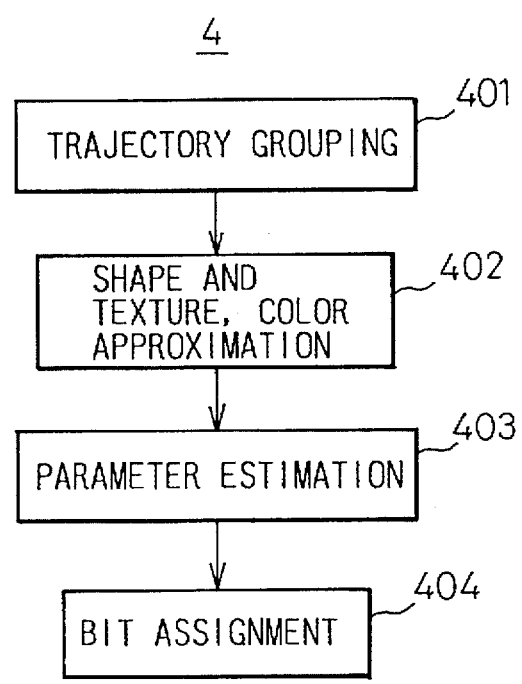

Fig. 3
(a) 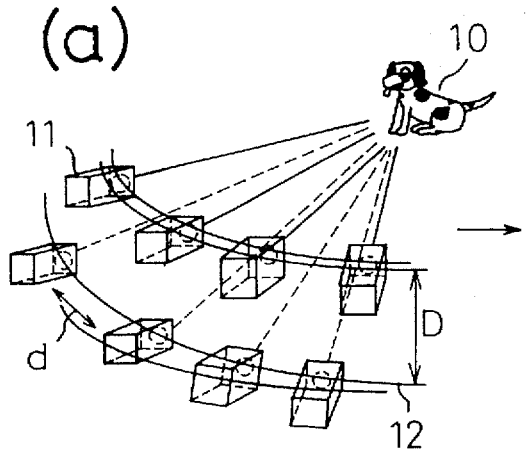
(b) 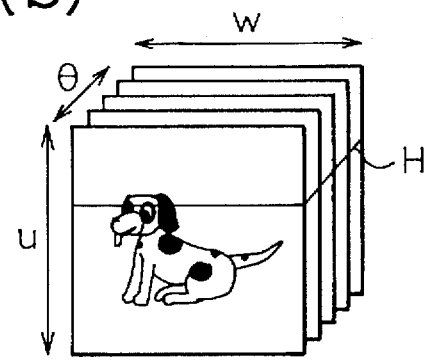
(d) 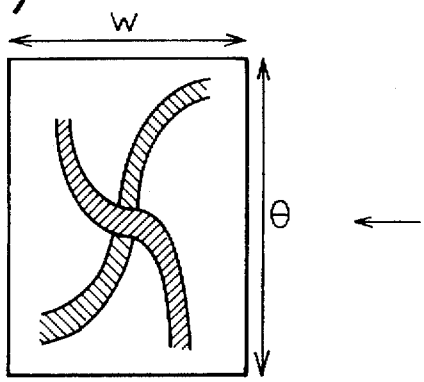
(c) 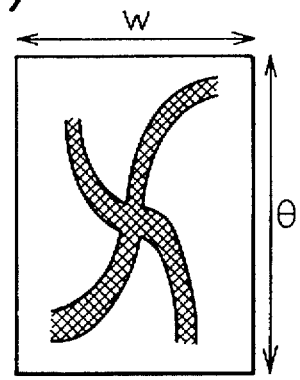
(e) 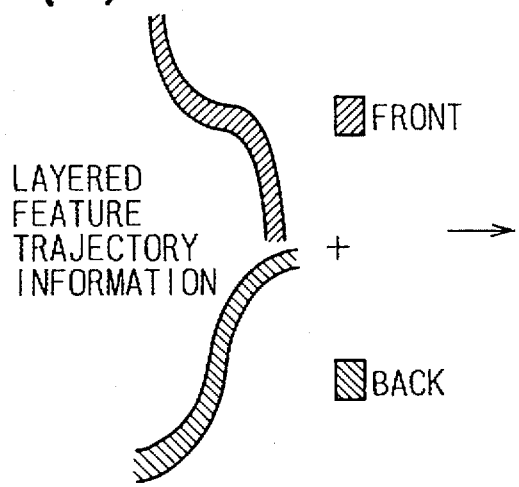
LAYERED FEATURE TRAJECTORY INFORMATION
▨ FRONT
▨ BACK
(f) 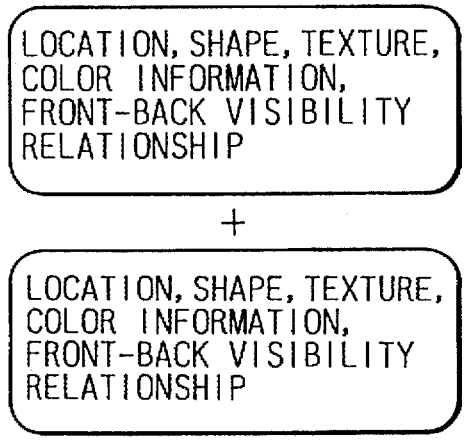
LOCATION, SHAPE, TEXTURE, COLOR INFORMATION, FRONT-BACK VISIBILITY RELATIONSHIP
+
LOCATION, SHAPE, TEXTURE, COLOR INFORMATION, FRONT-BACK VISIBILITY RELATIONSHIP Fig. 5
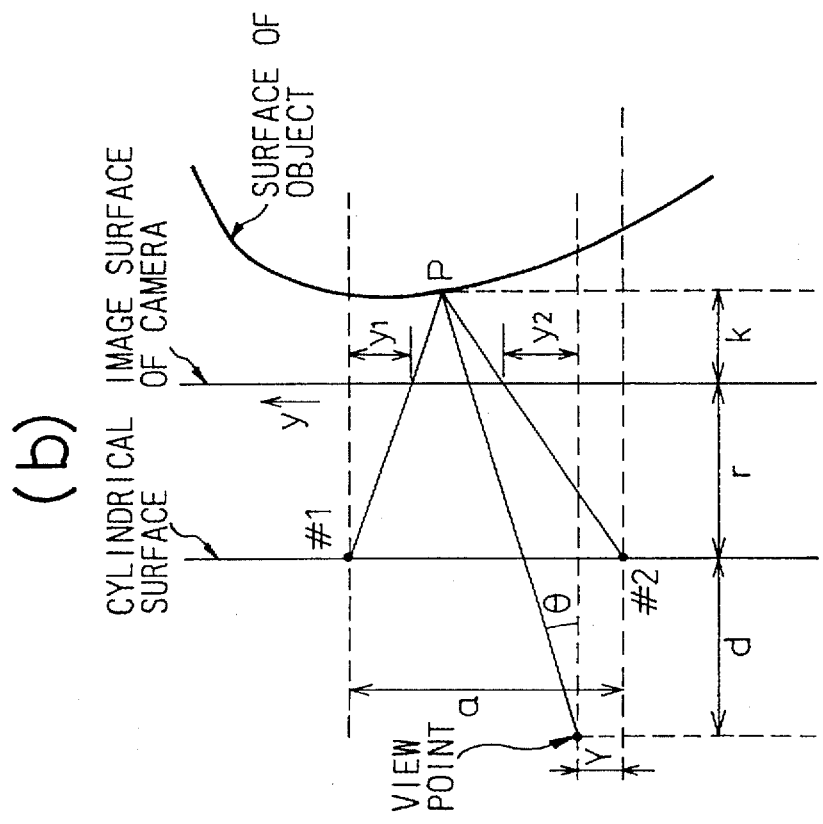
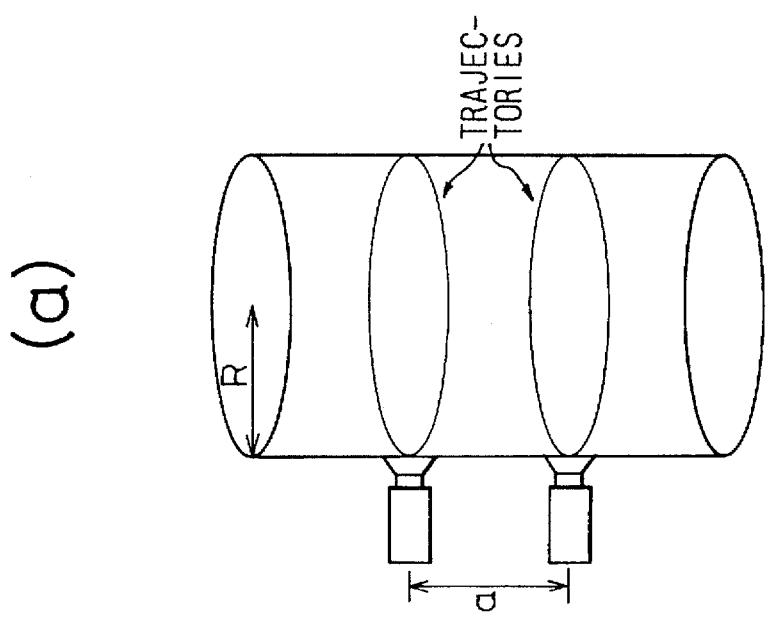

Fig. 22
(a)
LOCATION, SHAPE, TEXTURE, COLOR INFORMATION, FRONT-BACK VISIBILITY RELATIONSHIP
+
LOCATION, SHAPE, TEXTURE, COLOR INFORMATION, FRONT-BACK VISIBILITY RELATIONSHIP
(b)
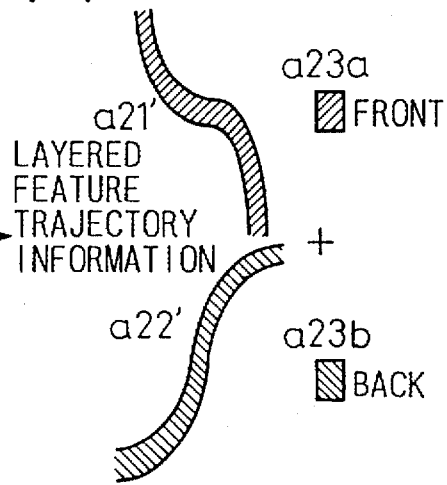
LAYERED FEATURE TRAJECTORY INFORMATION
(c)
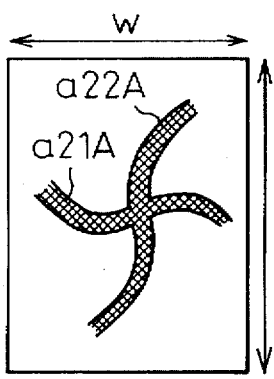
(d)
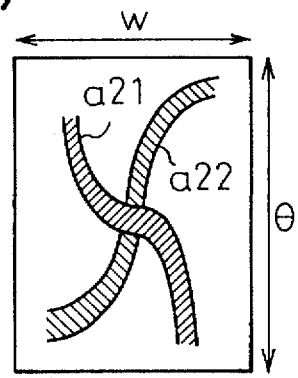
INPUT VIEWPOINT
(e)
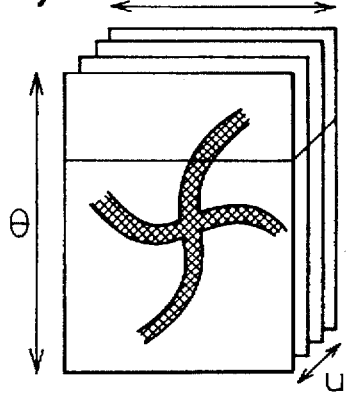
(f)
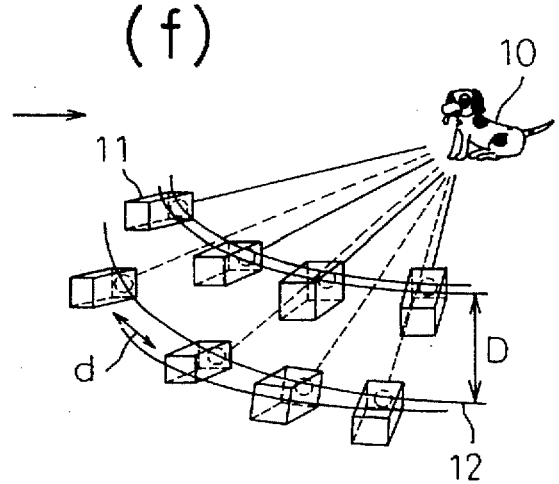

METHOD AND APPARATUS FOR PROCESSING 3-D MULTIPLE VIEW IMAGES FORMED OF A GROUP OF IMAGES OBTAINED BY VIEWING A 3-D OBJECT FROM A PLURALITY OF POSITIONS

BACKGROUND OF THE INVENTION

1. Field of the Invention

The present invention relates to a method and apparatus for processing 3-D multiple-view images comprised of images of a 3-D object seen from a plurality of viewpoints so as to enable one to render an image of the 3-D object as seen from any arbitrary direction.

By enabling the rendition and display of an image of a 3-D object as seen from any arbitrary viewpoint, it becomes possible to visually evaluate the design of the object or create a virtual reality environment. It has been desired to enable such image processing of a 3-D object at a higher speed and more economically.

2. Description of the Related Art

As systems for rendering and displaying images of a 3-D object as seen from any arbitrary viewpoint by computer processing, the computer graphics model system and the 3-D structure system are known. The computer graphic model system requires an extremely large number of polygons to render a realistic image. The amount of computation required for rendering a complex scene in real time increases along with the complexity of the scene. The latter 3-D structure system, on the other hand, stores a plurality of images and extracts and displays the image corresponding to any arbitrary viewpoint desired.

The 3-D structure system requires that a close to infinite number of images be acquired in order to display an image corresponding to any arbitrary viewpoint. Accordingly, various systems have been proposed for using images from adjacent viewpoints to approximate images between them. For example, a means for obtaining interpolated images by preparing environment maps expressed by groups of pixels as 3-D polygons from a new viewpoint and rendering the pixels is known. (See N. Greene and M. Kass, "Approximating visibility with environment maps", Technical Report 43, Apple Computer Inc., 1993.)

Further, a means for obtaining any arbitrary interpolated image by using a certain type of morphing based on stored images and correspondence maps between images is known. These correspondence maps are found by computations performed in advance using range data corresponding to the images. (See S. E. Chen and L. Williams, "View interpolation for image synthesis", Sigraph '93 Proceedings, pp. 279 to 288, 1993.)

The computer graphics model system suffers from the problem, as mentioned above, that the amount of computations increase along with the complexity of a scene and that it is difficult to render an image of a 3-D object from any arbitrary viewpoint in real time. Further, the 3-D structure system is less affected by the complexity of the scene, but requires close to an infinite number of images to be acquired in order to display a 3-D object from any arbitrary viewpoint specified by a user and therefore is hard to realize both technically and economically. In addition, the system of interpolation of correspondence of images may enable fewer images to be obtained compared with simple image systems, but requires reconstruction of a 3-D structure based on the correspondence between adjacent images and therefore suffers from the problem of an increased amount of computation required for the interpolation.

SUMMARY OF THE INVENTION

Therefore, an object of the present invention is to enable rendition of a 3-D image as seen from any arbitrary viewpoint economically and at a high speed.

To attain the above object, an apparatus for processing 3-D multiple-view images provided with an image acquisition means for acquiring 3-D multiple-view images of a 3-D object as seen from a plurality of viewpoints, an image analysis means for analyzing 3-D multiple-view images comprised of a plurality of images and finding the layered feature trajectory information comprised of trajectories linking identical points of the 3-D object, an image interpolation means for rendering by interpolation an image of the 3-D object seen from a specified (by user) viewpoint based on the layered feature trajectory information, an image compression means for approximating the shape and color and texture information for the individual trajectories of the layered feature trajectory information for and compression coding, a memory means for storing the coded layered feature trajectory information, and an image reconstruction means for reconstructing the coded layered feature trajectory information read from the memory means to the original layered feature trajectory information and applying it to the image interpolation means are provided.

BRIEF DESCRIPTION OF THE DRAWINGS

The above object and other features of the present invention will be more apparent from the following description of the preferred embodiments with reference to the accompanying drawings, wherein:

FIGS. 1A, 1B, 1C, and 1D are views of the basic configuration and specific configurations of different portions;

FIG. 3 is a view explaining an image analysis means;

FIG. 5 is a view explaining the image of a 3-D object as seen from viewpoints along a plurality of curves and viewpoints;

FIG. 13 is a view explaining labeling and a Sobel filter;

FIG. 22 is a view explaining an image interpolation means;

DESCRIPTION OF THE PREFERRED EMBODIMENTS

Figure 1A:
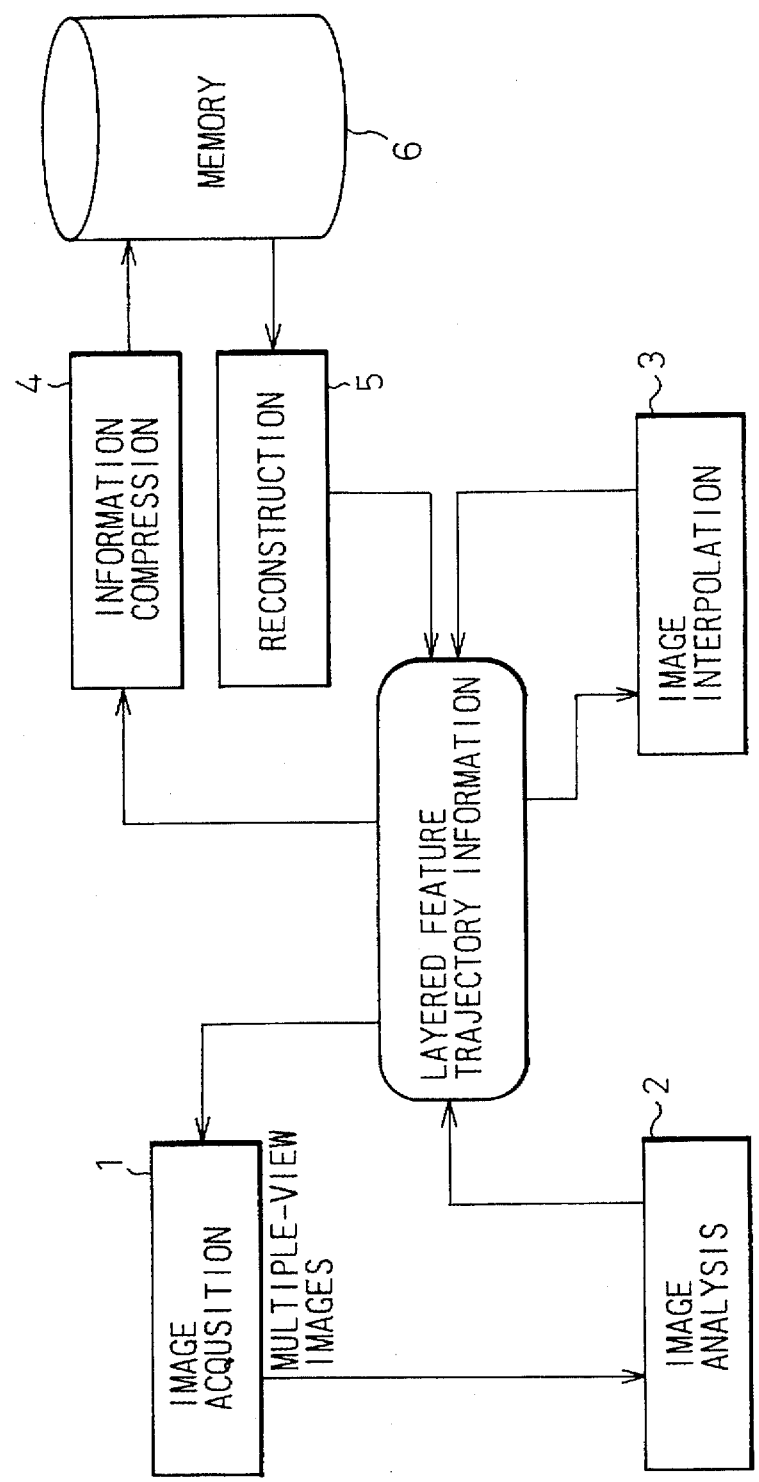

The embodiments of the present invention will be described next with reference to the related figures.

According to a first embodiment of the present invention, as explained with reference to FIG. 1A, a method of processing 3-D multiple-view images which includes a process of acquiring by an image acquisition means 3-D multiple-view images comprised of a group of images obtained by viewing a 3-D object from a plurality of viewpoints, finding by an image analysis means layered feature trajectory information connecting identical points of the 3-D object between images of the 3-D multiple-view images obtained by the image acquisition means, and finding by interpolation by an image interpolation means an image of the 3-D object viewed from any arbitrary viewpoint based on the layered feature trajectory information is provided.

According to the first embodiment, the method of processing 3-D multiple-view images either acquires images of a 3-D object as seen from a plurality of viewpoints by actually capturing them by a television camera or uses computer graphics etc. to acquire them, analyzes the 3-D multiple-view images comprised of the images as seen from the different viewpoints, and finds the layered feature trajectory information. The layered feature trajectory information is formed based on groups of trajectories connecting identical points of the 3-D object in the different images. The groups of trajectories show the state of the change of the appearance of certain points of the 3-D object as caused by the direction from which the 3-D object is viewed and make interpolation between images simple. In other words, when rendering an image of a 3-D object from a specified viewpoint based on the layered feature trajectory information, interpolation is performed by the image interpolation means 3 to render the 3-D multiple-view images and find the image from the specified viewpoint.

According to a second embodiment of the present invention, there is preferably further included a process of compression coding by an image compression means the layered feature trajectory information obtained by the image analysis means, storing the compression coded layered feature trajectory information in a memory means, decoding the compression coded layered feature trajectory information read out from the memory means, reconstructing the original layered feature trajectory information by an information reconstruction means, and inputting the same to the image interpolation means.

According to the second embodiment, the method classifies the groups of trajectories and approximates the boundaries and other parts of the shape by an approximation function so as to compression code the layered feature trajectory information and stores the same in a semiconductor memory, a magnetic disk unit, or other memory means 6. Further, it reconstructs the coded layered feature trajectory information read out from the memory means 6 into the original layered feature trajectory information using the information reconstruction means 5 and renders an image from the specified viewpoint by interpolation at the image interpolation means 3.

According to a third embodiment of the invention, there is provided an apparatus for processing 3-D multiple-view images provided with an image acquisition means for acquiring 3-D multiple-view images comprised of a group of images obtained by viewing a 3-D object from a plurality of viewpoints; an image analysis means for finding the layered feature trajectory information connecting identical points of the 3-D object between images of the 3-D multiple-view images obtained by the image acquisition means; and an image interpolation means for finding by interpolation an image of the 3-D object viewed from any arbitrary viewpoint based on the layered feature trajectory information obtained by the image analysis means.

According to the third embodiment, the apparatus for processing 3-D multiple-view images is provided with at least an image acquisition means 1, image analysis means 2, and image interpolation means 3. The image acquisition mans 1 can make use of a television camera which actually captures the 3-D object from a plurality of viewpoints or an image rendering means using computer graphics. Further, it may acquire images of the 3-D object as seen at equal intervals or uneven intervals along a single curve or a plurality of curves surrounding part or all of the 3-D object or a curve in any arbitrary direction on a curved surface. Further, the image analysis means 2 and the image interpolation means 3 may be realized by computation means of a computer. The image analysis means 2 stores the 3-D multiple-view images from the image acquisition means 1, for example, finds the trajectories connecting identical points of the 3-D object among the images for the same horizontal line. It does this for all horizontal lines. Further the groups of trajectories show the aspects of certain points of the 3-D object. The analysis means finds the layered feature trajectory information showing the features of the groups of trajectories, including the brightness information and color information. Further, it establishes correspondence of the plurality of groups trajectories based on the geometric invariance or color invariance based on the shape, distance, etc. Further, the image interpolation means 3 reconstructs the 3-D multiple-view images based on the layered feature trajectory information and can display an image of a specified viewpoint when the position for viewing the 3-D object is specified.

According to a fourth embodiment of the invention, the apparatus is further provided with an image compression means for compression coding the layered feature trajectory information obtained by the image analysis means; a memory means for storing the layered feature trajectory information coded by the information compression means; and an information reconstruction means for reading out and decoding the coded layered feature trajectory information stored in the memory means and inputting it to the image interpolation means.

According to the fourth embodiment, the information compression means 4 assigns bits to the layered feature trajectory information by approximating the feature portions by approximation functions etc. and therefore cuts the required capacity of the memory means 6. Further, the information reconstruction means 5 performs processing reverse to the information compression means 4 to reconstruct the layered feature trajectory information and inputs the result to the image interpolation means 3. The information compression means 4 and the information reconstruction means 5 can be realized by a computation means of a computer along with the image analysis means 2 and the image interpolation means 3.

According to a fifth embodiment of the invention, the image acquisition means is configured to acquire images of the 3-D object seen from a plurality of viewpoints along one or a plurality of curves.

According to the fifth embodiment, it is possible to analyze 3-D multiple-view images not only when a 3-D object is stationary, but also when it is in motion, by provision of a motion compensation unit in the image analysis means 2. This divides the motion of the 3-D object into rigid motion and non-rigid motion. In the case of rigid motion, it detects translation and rotation and modifies the layered feature trajectory information corresponding to the amount of motion. Further, in the case of non-rigid motion, it divides the motion into general rigid motion and local rigid motion and modifies the layered feature trajectory information in accordance with the amounts of motion. Due to this, it is possible to render an image of a moving object from a specified viewpoint.

According to a sixth embodiment, the image acquisition means is configured to acquire images of the 3-D object seen from a plurality of viewpoints along a plurality of curves formed on a curved surface surrounding part or all of the 3-D object.

According to a seventh embodiment, the image analysis means includes a feature trajectory formation part for finding groups of trajectories connecting identical points of the 3-D object among the images of the 3-D multiple-view images, an overlapped region classification part for detecting the overlapped regions of the feature trajectories and classifying the relative relationship of the overlapped regions; a visibility determination part for determining based on the groups of trajectories the visibility due to holes or concavities in the 3-D object, a part for extracting the coordinates, shape, color and texture information, and other features of the groups of trajectories, and a part for outputting the information obtained by the above means as a layered representation of feature trajectories.

According to an eighth embodiment of the invention, the image analysis means of the third or seventh embodiment establishes correspondence for the groups of trajectories of the 3-D multiple-view images acquired along the plurality of curves based on geometric invariance or color invariance and texture invariance, finds the amount of motion among groups of trajectories, and finds the amount of modification of the layered feature trajectory information based on the amount of motion and a geometric projection of the viewpoint.

According to a ninth embodiment of the invention, the apparatus of the third, seventh, or eighth embodiment interpolates the layered feature trajectory information at any arbitrary height based on a designated viewpoint based on the amount of modification of the feature trajectory information found by the image analysis means and produces a 3-D image from the viewpoint based on the results of the interpolation.

According to a tenth embodiment of the invention, the image analysis means of the third or seventh embodiment is provided with a motion compensation unit which finds the amount of motion of an object engaged in rigid motion or non-rigid motion in the 3-D multiple-view images and changes the layered feature trajectory information based on the amount of motion.

According to an eleventh embodiment of the invention, the motion compensation unit of the third or tenth embodiment is provided with a geometric projection part for finding the geometric projection between a viewpoint and the center of an object in rigid motion based on the amount of translation in the rigid motion, an address transformation part for transforming the addresses by the geometric projection from the viewpoint, a trajectory modification part for modifying the layered feature trajectory information based on the addresses transformed by the address transformation part, and a displacement part for displacing the layered feature trajectory information modified by the modification part.

According to a twelfth embodiment of the invention, the motion compensation unit of the tenth or fifteenth embodiment is provided with a classification means for classifying non-rigid motion into general rigid motion and local rigid motion, a first modification means for modifying the layered feature trajectory information overall by the amount of motion of the general rigid motion according to the classification means, and a second modification means for modifying the layered feature trajectory information partially by the amount of motion of the local rigid motion according to the classification means.

According to the 13th embodiment of the invention, the visibility determination part for determining the visibility at holes or concavities in the 3-D object in the image analysis means of the third or seventh embodiment performs control so as to acquire an image of the 3-D object seen at finer intervals from the image acquisition means for the nonvisible portions.

According to the fourteenth embodiment of the invention, the overlapped region classification part in the image analysis means for detecting overlapped regions of the groups of trajectories and classifying the relative relationships of the overlapped regions of the third or seventh embodiment is provided with a segmentation part for identifying points of discontinuity based on the groups of trajectories and segmenting the image into regions based on the points of discontinuity, a labeling part for labeling the regions showing identical portions of the 3-D object from the segmented regions, a merging part for merging labeled regions, and a visibility ordering part for determining the relative relationship between the merging portions according to the merging part and the merging portions of other regions and adding identifiers.

According to a fifteenth embodiment of the invention, the image interpolation means of the third embodiment is provided with a geometric projection part for finding geometric projections according to viewpoints, an address transformation part for transforming the addresses based on the geometric projections of the geometric projection part, a trajectory modification part for modifying the layered feature trajectory information based on the addresses according to the address transformation part, a visibility determination part for determining the relative relationship of the overlapped regions caused by the geometric projections, a trajectory synthesis part for synthesizing the layered feature trajectory information corresponding to the 3-D multiple-view images, a reconstruction part for reconstructing the 3-D multiple-view images based on the layered feature trajectory information, and an image rendering part for rendering an image from a designated viewpoint based on the 3-D multiple-view images.

According to a sixteenth embodiment of the invention, the address transformation part in the image interpolation means of the fifteenth embodiment enlarges or reduces the image rendered with respect to the designated viewpoint when the distance between the designated viewpoint and the center of the 3-D object differs from the distance at the time of acquiring the 3-D multiple-view images.

According to a seventeenth embodiment of the invention, an information compression part for compression coding the layered feature trajectory information obtained by the image analysis means of the third or fourth embodiment is provided with a trajectory grouping part for grouping the individual trajectories of the layered feature trajectory information, an approximation part for approximating the shape and color and texture information of the same, a parameter estimation means for finding parameters of the approximation functions of the shape and texture, color information of the groups formed, and a bit assignment means for assigning bits for the parameters.

According to the eighteenth embodiment of the invention, the information compression means of the seventeenth embodiment uses a polynomial as the approximation function of the shape information.

According to a nineteenth embodiment of the invention, the information compression means of the seventeenth embodiment uses a fractal function as the approximation function of the texture information.

According to a twentieth embodiment of the invention, the image reconstruction means of the third or fourth embodiment reconstructs the shape and color and texture information of a trajectory based on data read from the memory means so as to reconstruct the layered feature trajectory information.

More specific examples of the present invention will now be explained.

FIG. 1A is a view explaining the basic configuration of an embodiment of the present invention. In the figure, 1 is an image acquisition means, 2 is an image analysis means, 3 is an image interpolation means, 4 an information compression means, 5 an information reconstruction means, and 6 a memory means. The image acquisition means 1 acquires 3-D multiple-view images comprised of images of a 3-D object as seen from a plurality of viewpoints. For example, it may be configured to use a television camera to capture a 3-D object or may be configured to use computer graphics to render various images.

Figure 1B:
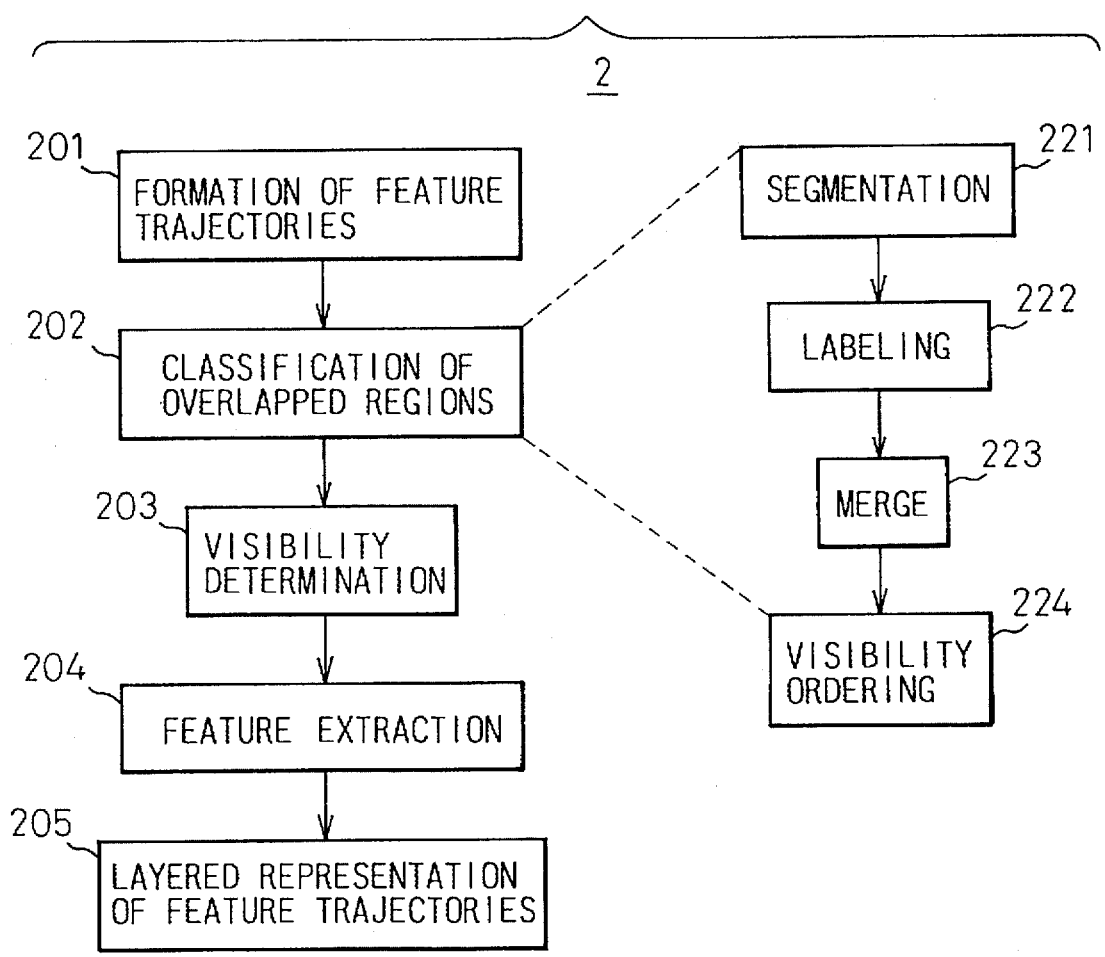

The image analysis means 2 and the image interpolation means 3, further, as shown in FIG. 1B, may be realized using the computation functions of a computer. The image analysis means 2 includes a feature trajectory formation part 201 for finding the groups of trajectories connecting identical points of a 3-D object among images of 3-D multiple-view images, an overlapped region classification part 202 for detecting overlapped regions of groups of trajectories and classifying their relative relationships, a visibility determination part 203 for detecting visibility due to holes or concavities in a 3-D object based on the groups of trajectories, a feature extraction part 204 for finding the coordinates, shape, and color and texture information of groups of trajectories, and a feature trajectory layered representation part 205 for representing as layered feature trajectory information the information obtained from the parts 201 to 204. Further, it may include a motion compensation unit (400, 500) for when the 3-D object is in motion.

Further, the image interpolation means 3, as shown in FIG. 1C, includes a geometric projection part 301 for finding geometric projections from viewpoints, an address transformation part 302 for transforming the addresses based on the geometric projections by the geometric projection part 301, a trajectory modification part 303 for modifying the layered feature trajectory information based on the addresses resulting from the address transformation, a visibility determination part 304 for determining the relative relationships of overlapped regions, a trajectory synthesis part 305 for synthesizing layered feature trajectory information corresponding to the 3-D multiple-view images, a multiple-view image reconstruction part 306 for reconstructing 3-D multiple-view images based on the layered feature trajectory information, and an arbitrary viewpoint rendering part 307 for rendering an image from a specified viewpoint based on the 3-D multiple-view images.

Further, the information compression means 4, as shown in FIG. 1D, includes a trajectory grouping part 401 for grouping the trajectories by classification of aspects etc., a shape and texture approximation part 402 for approximating the shape information and the texture information for individual trajectories in the layered feature trajectory information, a parameter estimation part 403 for estimating the parameters of approximation functions between the shape information and texture, color information of the groups, and a bit assignment part 404 for assigning bit to the parameters. Further, the information reconstruction part 5 reconstructs the layered feature trajectory information by processing reverse to that of the information compression means 4. The memory means 6 may be configured by a semiconductor memory or magnetic disk unit or other relatively large capacity memory.

Figure 2:
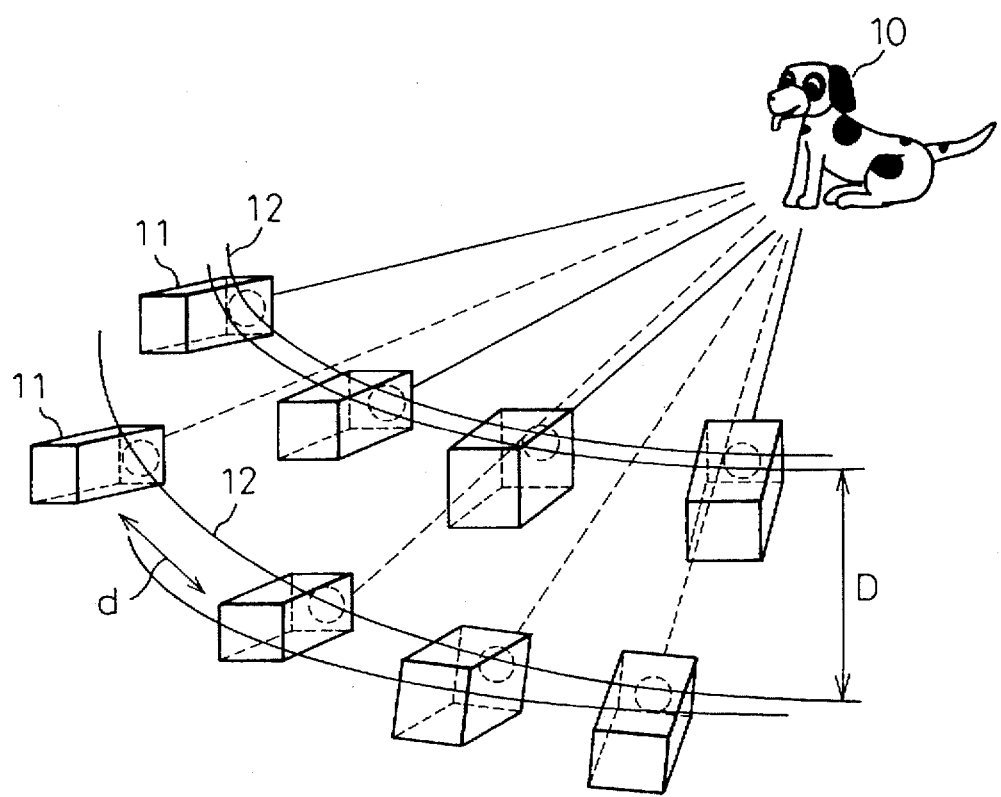
FIG. 2 is a view explaining an image acquisition means.

FIG. 2 is a view explaining the image acquisition means 1. Here, the 3-D multiple-view images are images of a 3-D object 10 captured by a television camera 11 at intervals d along a single curve 12 or a plurality of curves 12 at intervals D. In this case, the interval D between the curves 12 and the interval d between viewpoints for acquiring images of the 3-D object 10 along the curve 12 are generally uniform, but it is also possible to make one or both of the intervals D and d unequal. Further, the curve 12 includes a curve close to one with an infinitely large radius.

The curve 12 is formed on a curved surface surrounding part or all of the 3-D object 10. This curved surface is generally a spherical surface, but use may also be made of a circular cylinder, cube, ellipsoid, quadric hypersurface, etc. Further, it is not necessary to position the 3-D object 10 at a position corresponding to the center of the curved surface. The relationship between the 3-D object 10 and the curved surface may be freely selected. Also, when detecting a portion which is not visible due to a hole or concavity of the 3-D object 10 by the visibility determination part 203 in accordance with results of analysis of the 3-D multiple-view images by the image analysis means 2, a control part 206 is used to control the system to acquire images of the 3-D object 10 as seen at finer intervals. For example, it is possible to acquire images of the 3-D object 10 at intervals of a fraction or subfraction of the interval d.

FIG. 3 is a view explaining the image analysis means 2 in an embodiment of the present invention. (a) shows the image acquisition means 1 shown in FIG. 2. The images of the 3-D object 10 as seen from a plurality of viewpoints become the images shown in (b). That is, 3-D multiple-view images are rendered by the set of images of the 3-D object 10 as seen from the plurality of viewpoints. In this case, θ is the parallax axis showing the angle with respect to the 3-D object 10 from a viewpoint along the curve 12, u shows the vertical axis of the image, and w shows the horizontal axis of the image.

Showing the relationship between two points seen when slicing the 3-D multiple-view images (b) by the same horizontal scanning line H for example, the trajectories shown in (c) are obtained. Pixel by pixel correspondence is established (d), the trajectories are separated and the relative relationship of the intersecting portions is distinguished, and this is made the layered feature trajectory information (e). Further, this is made the information on the location, shape, texture, color, front-back visibility relationship, etc. (f).

Figure 4:
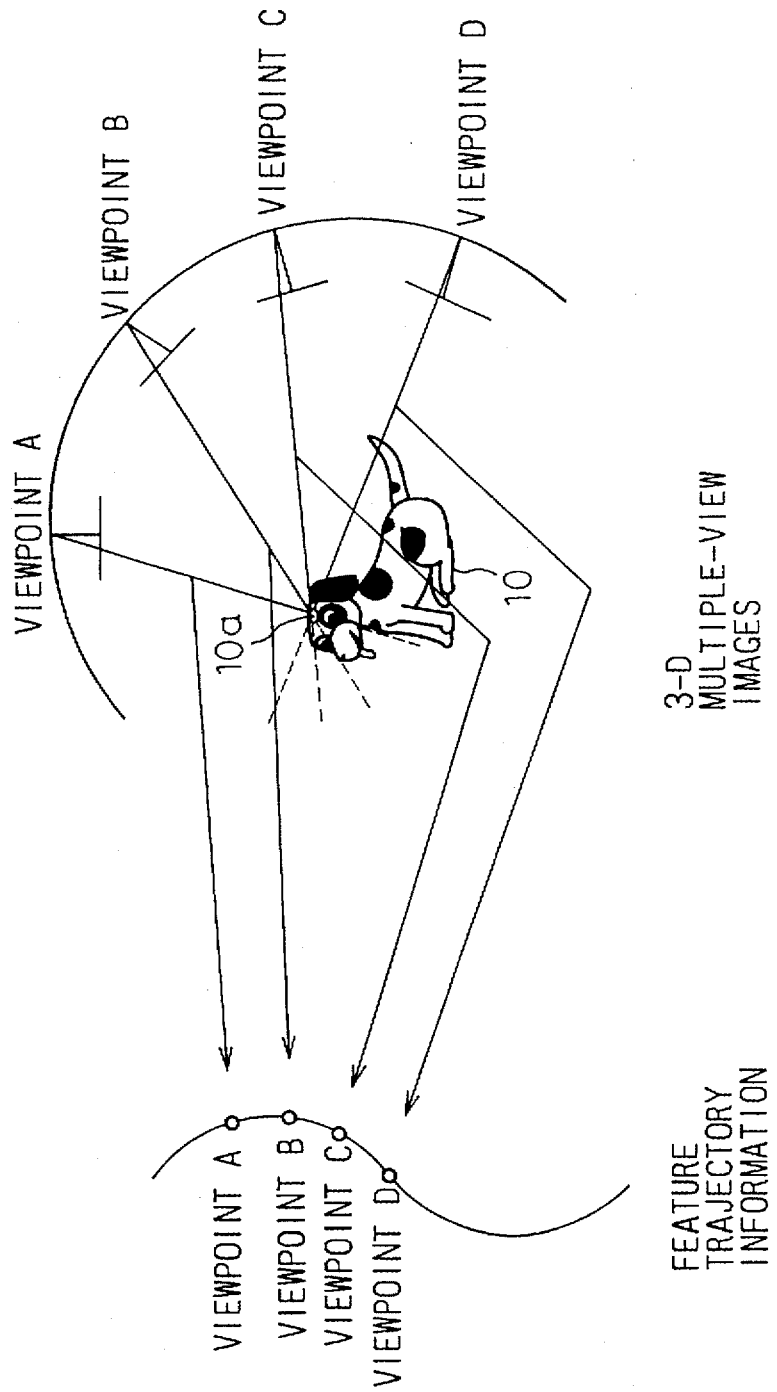
FIG. 4 is a view explaining the correspondence between 3-D multiple-view images and the feature trajectory information.

FIG. 4 is a view explaining the correspondence between the 3-D multiple-view images and the feature trajectory information. The same point 10a of a 3-D object 10 in different images of 3-D multiple-view images of the 3-D object 10 as seen from the viewpoints A, B, C, and D along any arbitrary curve becomes the trajectory shown by the viewpoints A, B, C, and D on the left curve.

FIG. 5 is a view explaining the images of a 3-D object as seen from viewpoints along a plurality of curves and the viewpoints. In (a), when a camera is moved along a plurality of trajectories (curves) at intervals a on a cylindrical surface of a radius R so as to capture a 3-D object (not shown) and acquire a series of images, if it is assumed that the series of images as a whole can capture a desired range, then as shown in (b) if the distance between a viewpoint y and camera (cylindrical surface of radius R) is d, the distance between the camera and the image surface of the camera is r, and a point P is on the object (3-D object) in a direction forming an angle θ with the direction of the line of sight at the time, then the relative y-coordinates of the point P in the image series #1 and #2 are $y_1$, $y_2$ (however, $y_1<0$, $y_2>0$). Further, if the distance of the point P from the camera image surface is made k, then $$a/(a+y_1-y_2)=(k+r)/k \quad (1)$$

$$k=r(a+y_1-y_2)/(r_2-y_1) \quad (2)$$

The relationship of the following equation stands between $y_2$ and θ:

$$Y+(d+r+k)\tan\theta=\{(r+k)/r\}y_2 \quad (3)$$

Accordingly, the point P corresponds to a point at the position of $y=y_2$ determined by the equations (2) and (3) above in the image series #2.

As explained above, it is possible to find the range of the image series corresponding to the portion in view. Further, the image intensity data of the corresponding portion is taken out from the original image series and scaling is performed to make it match with the width of the view. In this case, it is necessary that correspondence can be established between pixels among adjacent image series. Also, in image synthesis, when synthesizing an image from a plurality of groups of trajectories, it is possible to establish correspondence for a plurality of groups of trajectories based on the geometric invariance and the color invariance. As the geometric invariance, for example, it is possible to use the curvature of contours in the case the shape is based on or the distance between characteristic points. As the color invariance, in the case of a color image, the color information is expressed by intensity values of RED, GREEN, BLUE (RGB) color model. In the ideal state where there is no effect from illumination, the intensity value of a certain point on the surface of the object concerned does not vary even if the position from which the object is captured differs, so it is possible to consider this to be an invariable amount.

The correspondence between groups of trajectories may be established by the following algorithm:

1. Images having the same rotational angle as the viewpoint are taken out from the adjacent image series to prepare binocular images.

2. In the binocular images, edge detection is performed to extract the contours and a directional filter is used to find the tangent and curvature of the contours.

3. The geometric invariance in the contours is calculated based on the tangent and curvature of the contours and this geometric invariance is used to establish correspondence between binocular images.

4. Based on the correspondence established between contours and the color and texture invariance between groups of trajectories, correspondence between groups of trajectories is established between adjacent image series.

Figure 6:
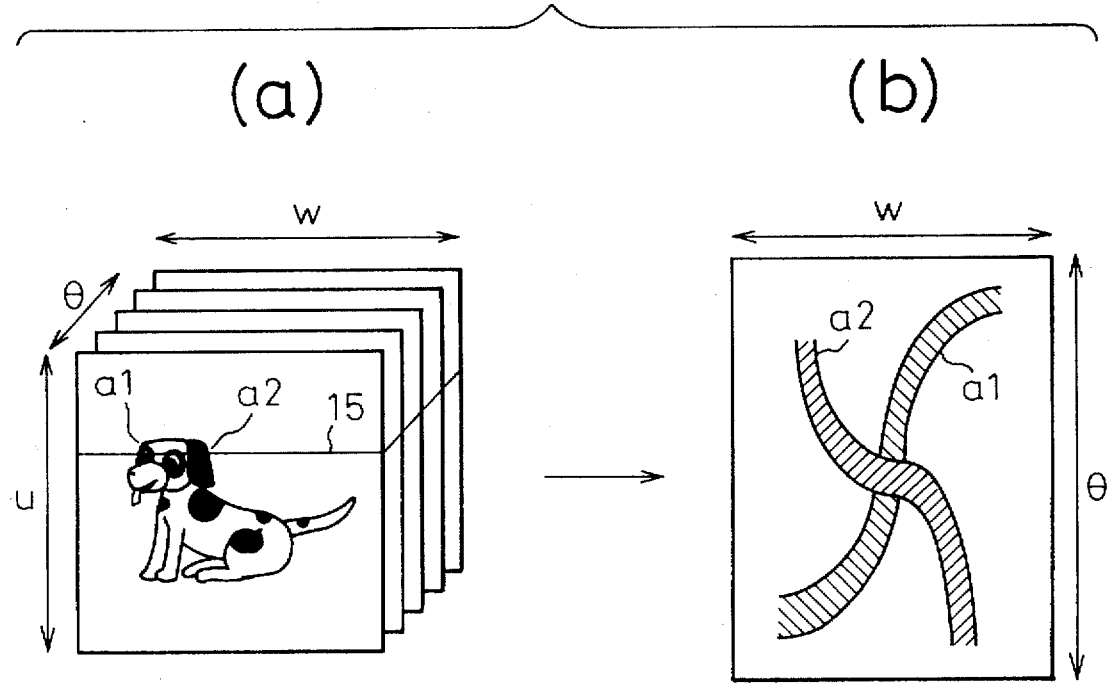
FIG. 6 is a view explaining layered feature trajectory information.

FIG. 6 is a view explaining the layered feature trajectory information. The relationship between images in the direction of the parallax axis θ is shown by (b) for the two points a1 and a2 on the same horizontal line 15 of the 3-D multiple-view images of (a). That is, the points a1 and a2 gradually approach each other from a separated state by the change of the direction of viewing of the 3-D object 10. After the points a1 and a2 overlap in appearance, they gradually separate as shown in (b).

Figure 7:
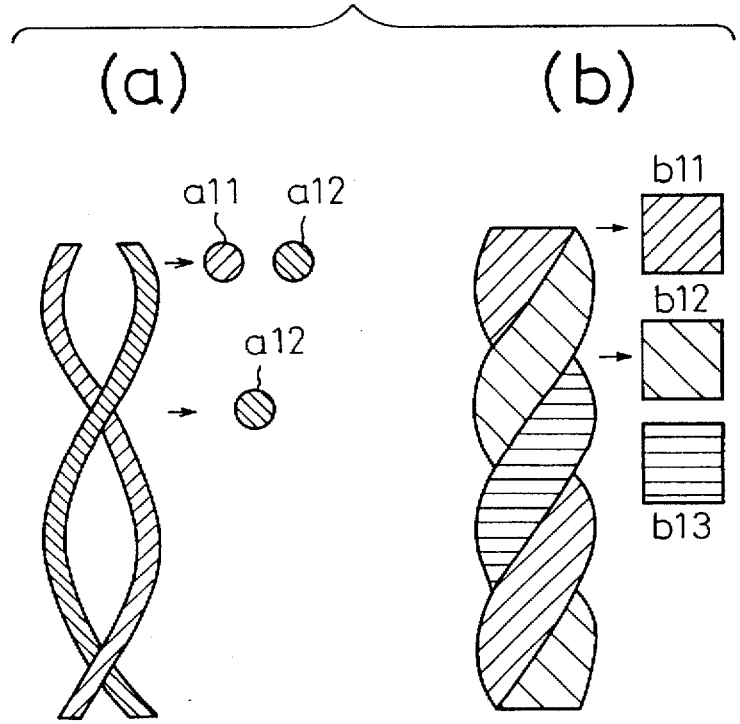
FIG. 7 is a view explaining an epipolar plane image.

FIG. 7 is a view explaining an epipolar plane image. (a) shows the trajectories in the case of varying the viewpoints for a 3-D object including two points a11 and a12 which change in distance, but do not change in width depending on the direction of viewing. First, the mutually separated points a11 and a12 gradually approach each other by the change of the viewpoints, then finally overlap and enter a state where only the point a12 is visible, then once again separate from each other.

(b) shows the trajectories in the case of varying the viewpoints for a 3-D object consisting of a set of the points b11, b12, and b13 forming a squares at the front surfaces. The points b11, b12, and b13 are twisted like a rope. No space is caused between them.

Figure 8:
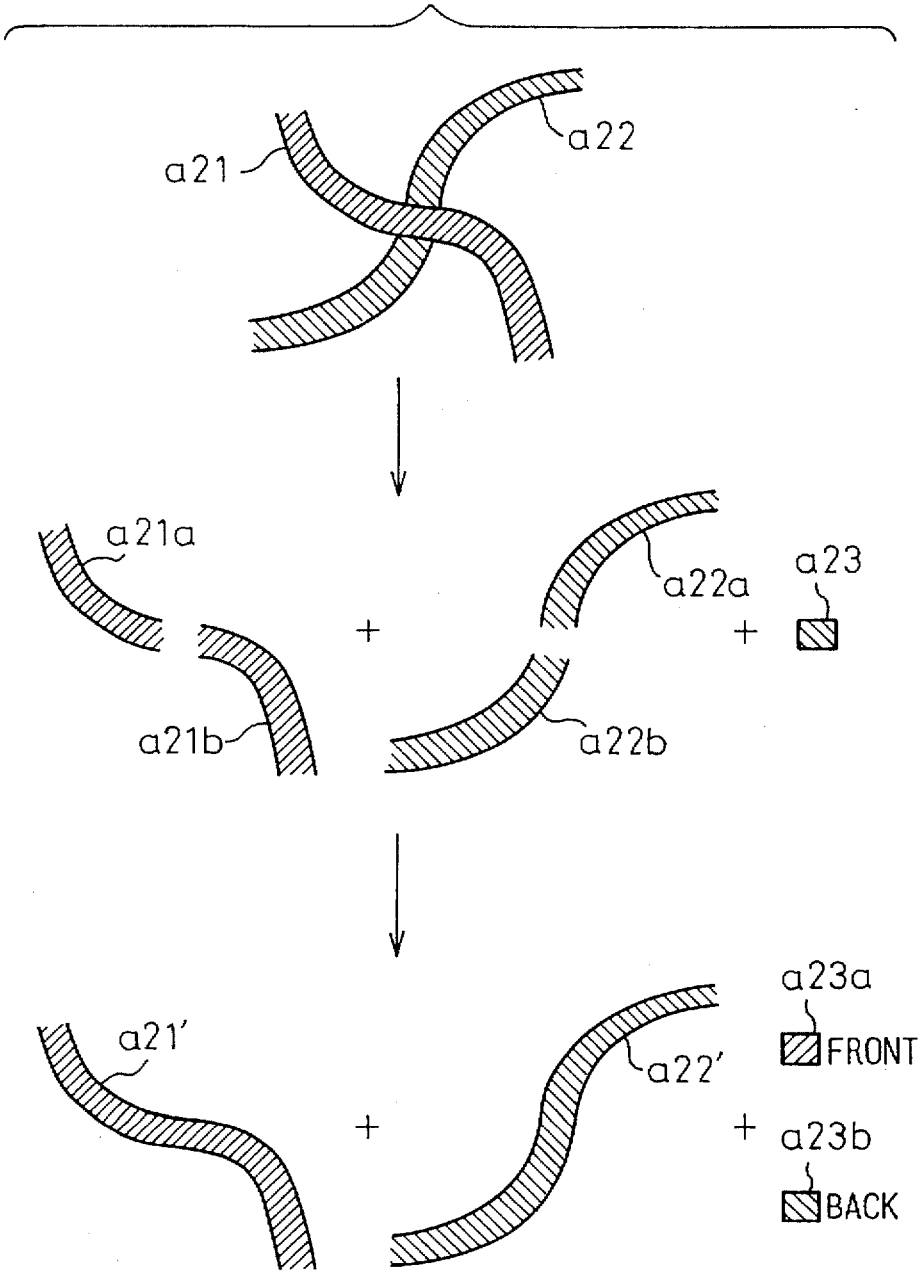
FIG. 8 is a view explaining processing of overlapped regions.

FIG. 8 is a view explaining the processing of overlapped regions. Referring to FIG. 1B as well, this shows the processing in the arrow direction in the figure of the overlapped region classification part 202 in the image analysis means 2. The overlapped region classification part 202 is comprised of a segmentation part 221, a labeling part 222, a merging part 223, and a visibility ordering part 224. In this configuration, since the trajectory a22 is cut off by the trajectory a21 at the overlapped regions of the trajectories a21 and a22, the trajectories are segmented into the trajectories a21a, a21b, a22a, and a22b by the overlapped region a23.

The labeling part 222 judges if the same portion of the 3-D object is expressed or not by the segmented trajectories a21a, a21b, a22a, and a22b. The merging part 223 merges the trajectories a21a and a21b and the trajectories a22a and a22b judged to be of the same portion and makes them the trajectories a21' and a22' and judges the front-back visibility relationship of the overlapped region a23. The visibility ordering part 224 adds identifiers showing the front-back visibility relationship to the merged portions (overlapped regions) a23a and a23b.

Figure 9:
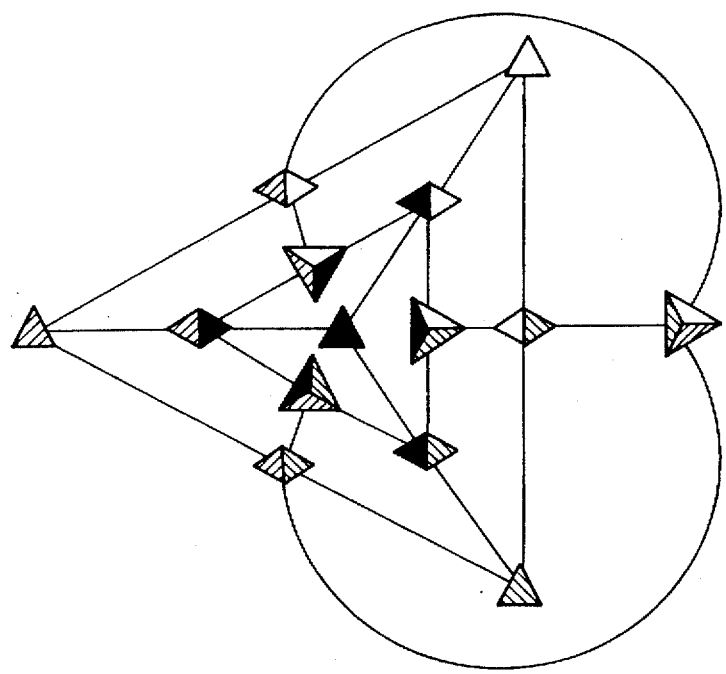
FIG. 9 is a view explaining an aspect graph.

FIG. 9 is a view explaining an aspect graph. It shows this for a tetrahedron comprised of a white face, a right hatching face, a left hatching face, and a black face. The aspect graph quantitatively classifies into a plurality of groups the differences in aspect for a certain object due to the position of viewpoint and graphs the relationship between the classes of the same. In a certain class of aspect, by adding suitable quantitative information, it is possible to predict the change in aspect by the motion of the viewpoint, but when the viewpoint moves to another class, it becomes no longer possible to cope with this.

In this aspect graph, a node corresponds to an aspect and an edge indicates a change in aspect, that is, an event (for example, a new face becoming visible). Further, a set of positions of viewpoints corresponding to a single aspect (spatial region) is called a "cell" and the crossing of a boundary between cells by a viewpoint is called an event. Accordingly, an aspect graph may be said to be one criterion in processing quantitative information.

Figure 10:
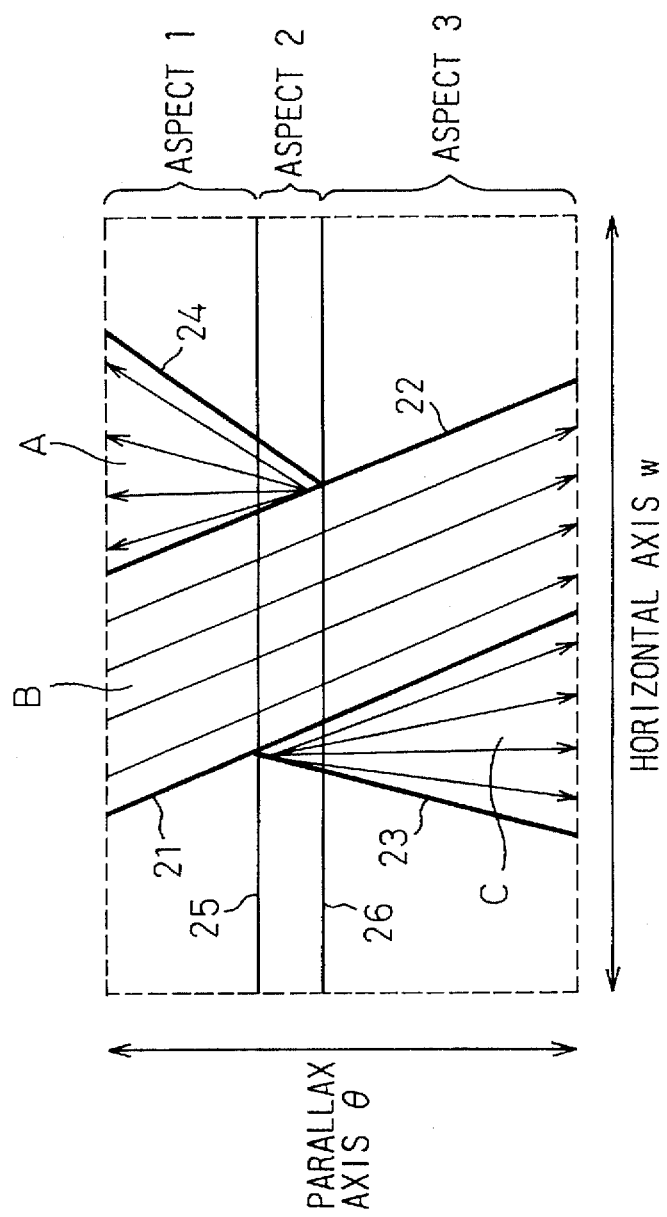
FIG. 10 is a view explaining the classification of aspects.

FIG. 10 is a view explaining the classes of aspects. The abscissa shows the horizontal axis w, while the ordinate shows the parallax axis θ. The aspect graph classifies aspects according to what kind of shape the boundaries between the 3-D object and space take. The aspects are classified only for a certain single epipolar plane. This classification of aspects is designed for use for interpolation etc. That is, the aspects are classified according to what points are visible among any arbitrary points on the surface of a 3-D object.

That is, the thick lines 21 to 24 of one portion of the epipolar plane of a polyhedron shown schematically in FIG. 10 show the trajectories of the summits obtained at the surfaces of the polyhedron cut by the epipolar plane. The projection of a point on the 3-D object on to the multiple-view images moves as shown by the arrow. This arrow shows the correspondence between pixels. In this case, the plane is divided into three aspects (aspect 1, 2, and 3). That is, if covering just the pixels on the epipolar plane, by combining the surface regions (A, B, and C) seen on the original multiple-view images, the result is three aspects as divided by the lines of division 25 and 26 in the direction of the horizontal axis.

Figure 11:
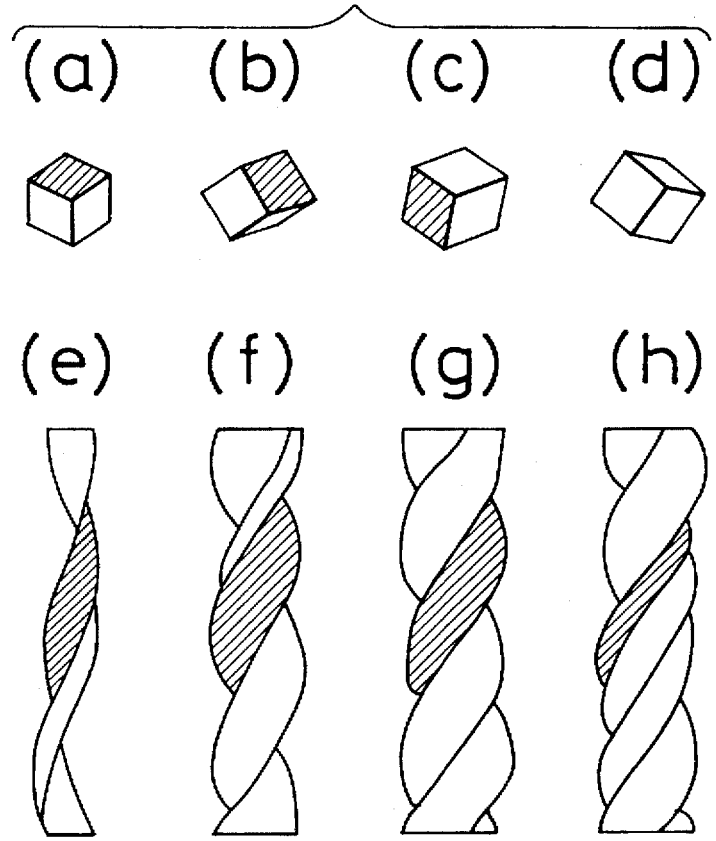
FIG. 11 is a view explaining 3-D multiple-view images and epipolar plane images.

FIG. 11 is view explaining the 3-D multiple-view images and epipolar plane image. (a) to (d) show the 10th, 55th, 100th, and 145th (frame) images obtained when rendering images of the 3-D object as seen from viewpoints at 2° intervals along a curve surrounding the entire 3-D object, based on a 3-D object obtained by computer graphics, and arranging 180 image frames in the order of rendition.

(e) to (h) show the epipolar plane images at the 13th, 20th, 30th, and 39th horizontal lines respectively for the 3-D multiple-view images defined by the above 180 image frames. If one certain point of the 3-D object is tracked in the order of acquisition of the 3-D multiple-view images, a single curve is obtained. This is true not only in the case of 3-D multiple-view images acquired consecutively, but also in the case of 3-D multiple-view images acquired at certain intervals. That is, as shown by (e) to (h), it is possible to obtain epipolar plane images at each certain height (or along each certain horizontal line).

In actuality, it is not possible to recognize trajectories on an epipolar plane image for all points on the surface of a 3-D object. The reason is that an epipolar plane image is an image based on intensity and it is not possible to distinguish between two points on the surface of a 3-D object expressed by similar intensity values. Therefore, to recognize the spread of a surface region having similar intensity values on a 3-D object in an epipolar plane image, segmentation is performed on the epipolar plane image based on the intensity values.

This segmentation for example involves edge detection using a Sobel filter. The results of edge detection are shown in (a) to (d) of FIG. 12. A region is grown and labeled for each pixel above the points detected as being edges.

Figure 13:
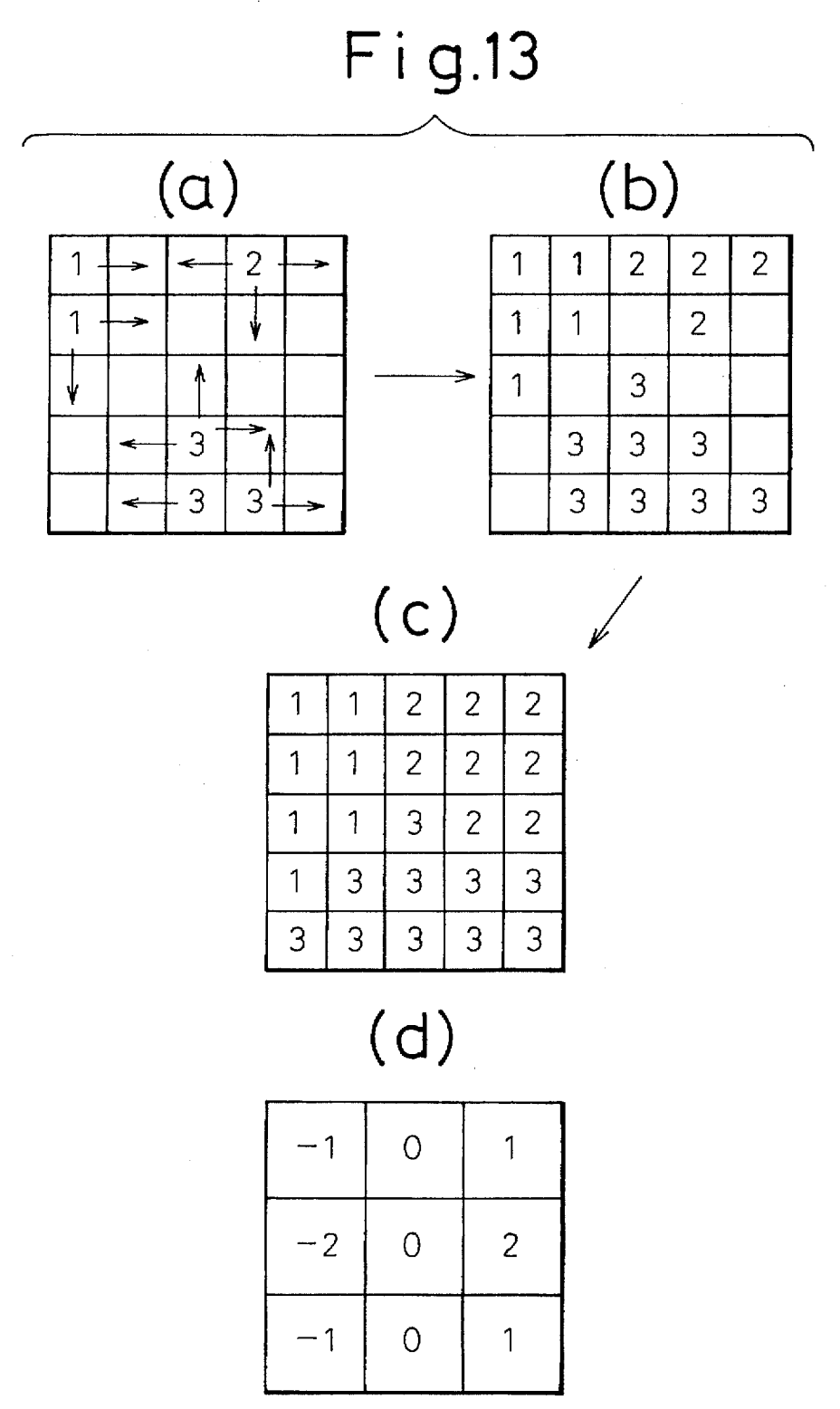

FIG. 13 is a view explaining the labeling and the Sobel filter. (d) shows a Sobel filter. It shows the case of a 3×3 configuration. The center of the Sobel filter is made to match the pixel in question and the absolute value of the sum of the values obtaining by multiplying the coefficient of the Sobel filter with each pixel and the absolute value obtained by computation in the same way after rotating the Sobel filter 90 degrees are added. This is performed for each color, red, green and blue. When a threshold value (for example 40) is exceeded, the pixel in question is recognized as an edge point. The results of detection of edges for the epipolar plane image of (e) to (h) of FIG. 11 are shown in (a) to (d) of FIG. 12.

(a) of FIG. 13 shows the initial state of labeling. The pixels of the edge points are shown as empty. As shown by the arrows in the figure, region growing is performed for each pixel to the top, bottom, left, and right of the pixels of the relative brightnesses of 1, 2, and 3. In this case, when growth is performed from a plurality of regions simultaneously for a single edge point, for example, priority is given to the region at the top of the edge point, the region to the left, the region to the right, and the bottom region, in that order, and growth is performed from the region with the highest priority.

Figure 12:
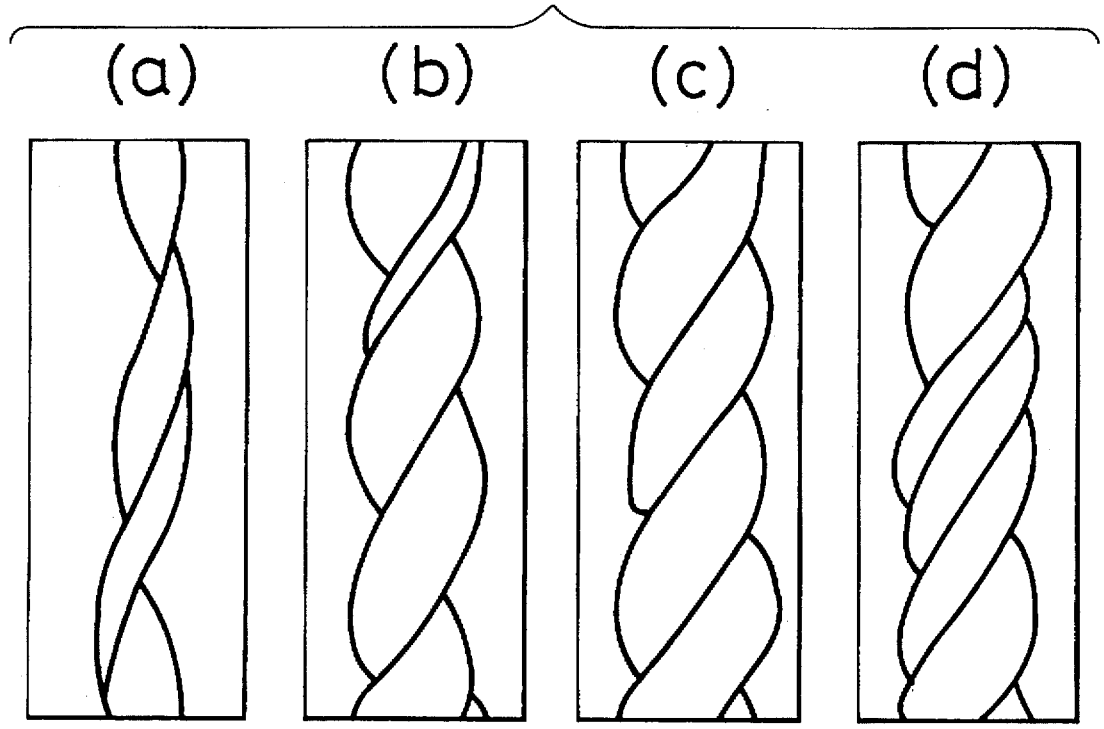
FIG. 12 is a view explaining resultant edge detections.
Figure 14:
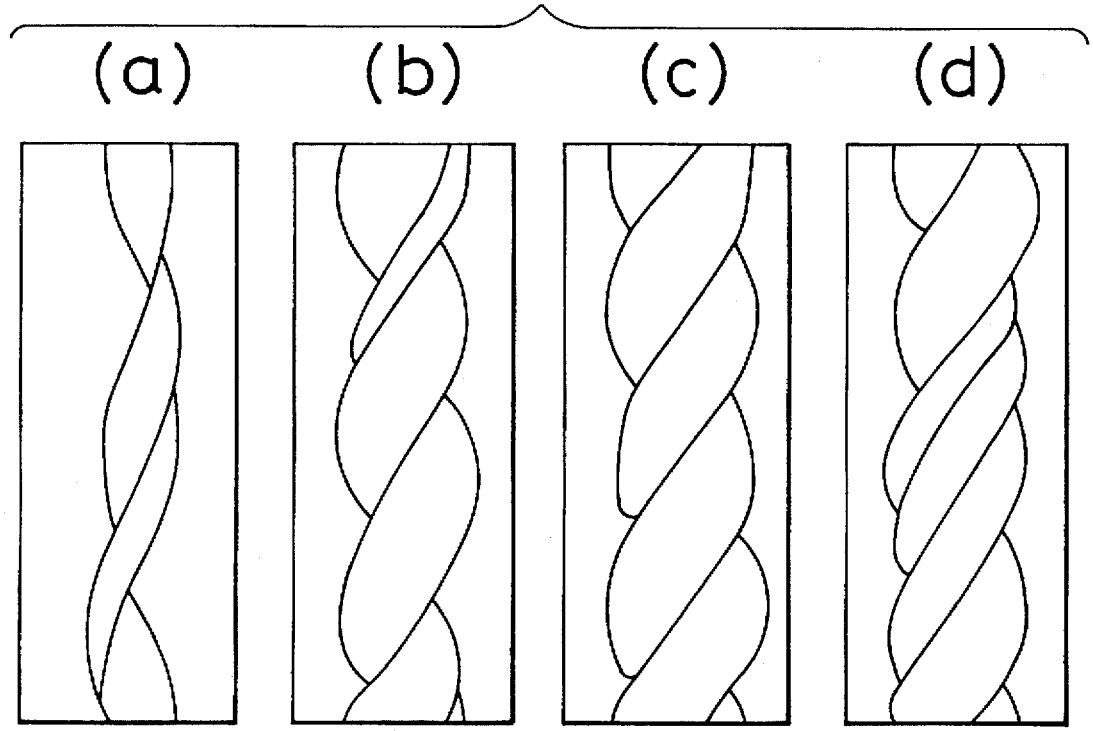
FIG. 14 is a view explaining the resultant segmentations.

(b) in FIG. 13 shows the results of region growth shown by the arrows in (a). By continuing the region growth further from this state, the edge points are labeled as shown by (c). The results of segmentation by the labeling of the epipolar plane image by the results of edge detection of (a) to (d) of FIG. 12 are shown in (a) to (d) of FIG. 14.

Figure 15:
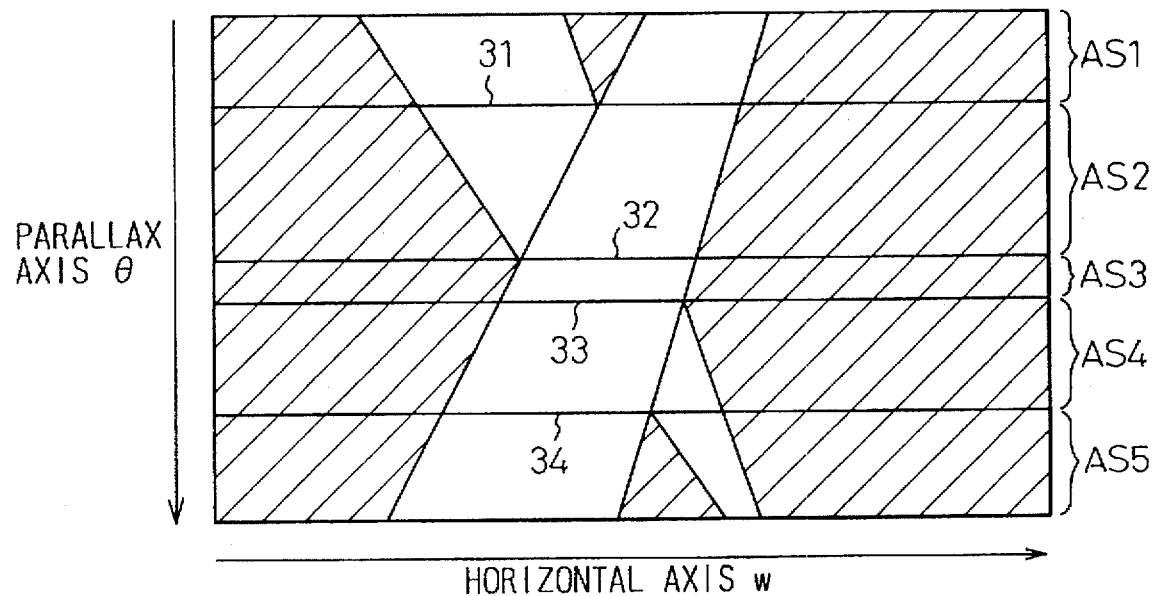
FIG. 15 is a view explaining the classification of aspects.

FIG. 15 is a view explaining the classification of aspects. It shows the case where the boundaries for a part of the epipolar plane image are shown by straight lines. The image is divided by the lines of division 31 to 34 passing through the intersections of the boundaries in the direction of the horizontal axis to give the aspects AS1, AS2, AS3, ...

Figure 16:
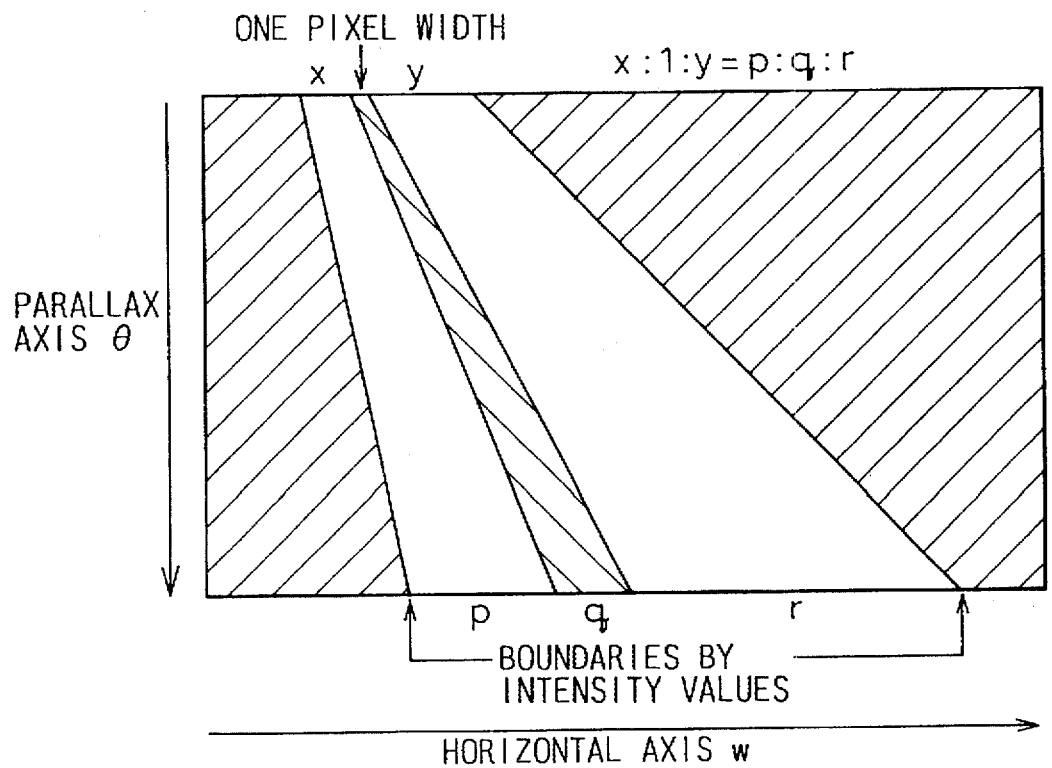
FIG. 16 is a view explaining the establishment of pixel correspondence.

FIG. 16 is a view explaining establishment of correspondence of pixels. If the top of the portion given the hatching for example in the regions divided by the lines of division of aspects and the boundaries of the intensity is set as one pixel width, then when the pixel widths on the two sides are made x and y, the bottoms have widths of p, q, and r. This figure shows the example of the case where the relationship x:1:y=p:1:r stands. The portions giving the hatching may be considered to be trajectories on the epipolar plane image for certain points on the surface of the 3-D object. In the original multiple-view images, the pixels corresponding to the hatching portions can be recognized as indicating the same surface regions (can be given correspondence).

Figure 17:
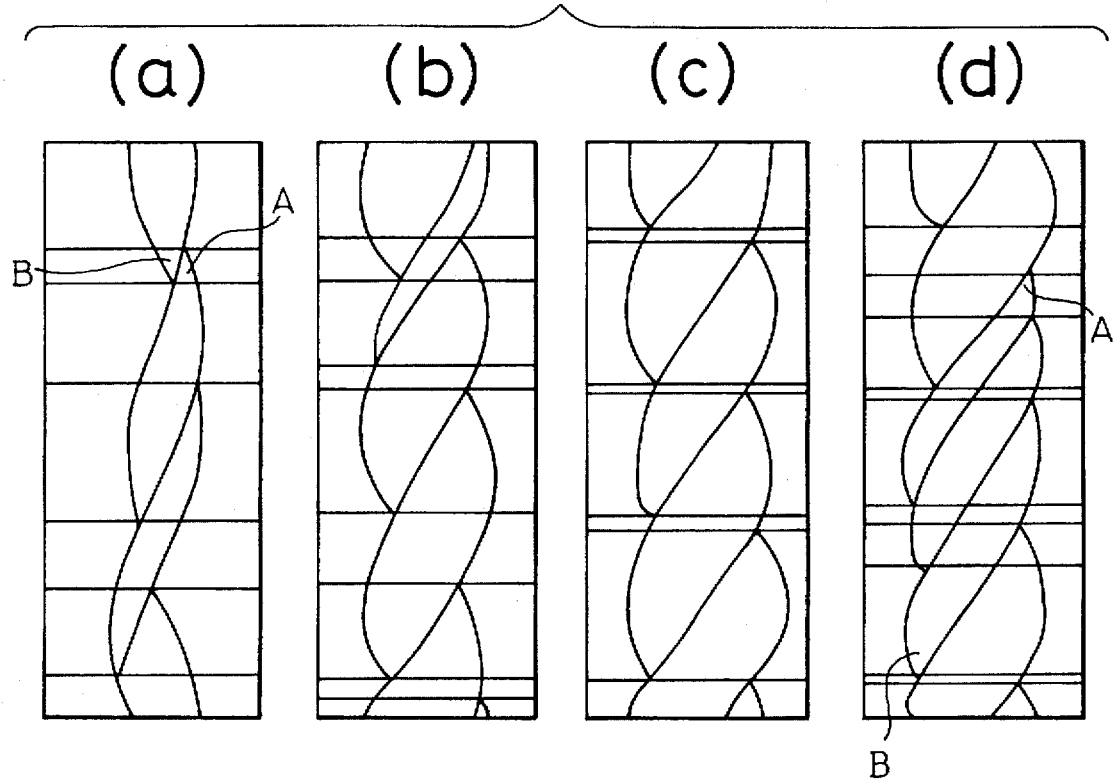
FIG. 17 is a view explaining the resultant classification of aspects.

FIG. 17 is an explanatory view of the results of classification of aspects. (a) to (d) show the results when classifying aspects for the results of segmentation shown in (a) to (d) of FIG. 14, respectively. That is, division is by the lines of division passing through the intersections of the boundaries obtained by segmentation (showing the event (A) where a new face begins to be visible and the event (B) when a certain face is no longer visible). In this case, since it is possible to express an epipolar plane image by the shape information approximated by the third-order polynomial or other function, the color information between boundaries, the division line information, and the intensity information on the lines of division, the information can be compressed.

Figure 18:
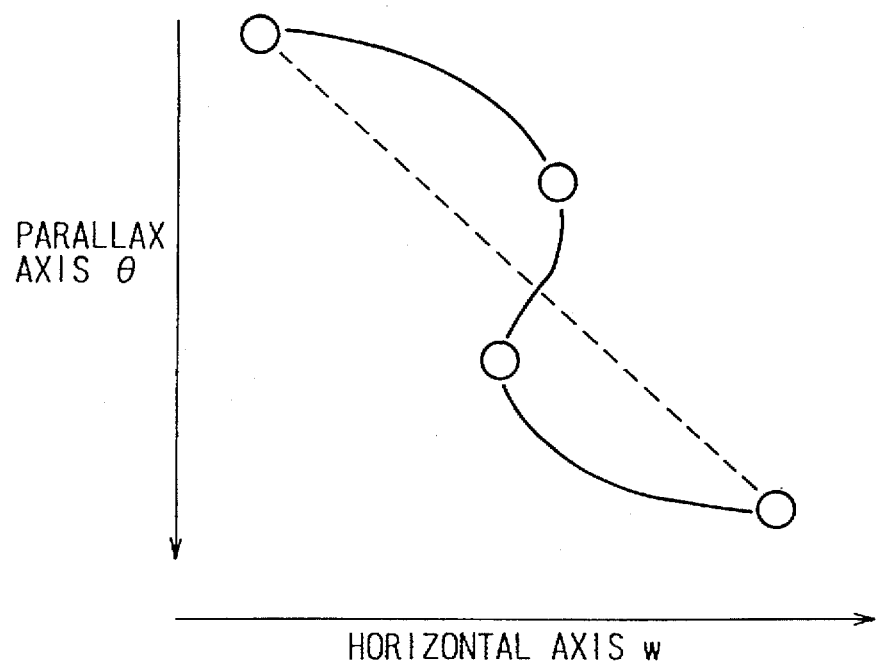
FIG. 18 is a view explaining approximation of boundaries.

FIG. 18 is a view explaining approximation of a boundary. It approximates a boundary resulting from segmentation by a polynomial. If the real curve is a boundary, then it is possible to use a third-order equation connecting the four points shown by the white circles dividing the boundary into three in the direction of the parallax axis. Further, if use is made of a linear equation as the approximation function, the relationship of the dotted line is shown. Note that when using a third-order equation rather than using a linear equation, the reconstructed layered feature trajectory information becomes more similar to the original layered feature trajectory information.

For example, the boundary caused by the brightness value is approximated by a third-order polynomial. Further, the mean value of the intensity of the regions given the hatching in FIG. 16, for example, is projected on the top line of division. This is done for each pixel on the line of division. The result is used as one line's worth of intensity information on the line of division. Alternatively, it is possible to use the intensity values on the line of division as the intensity information.

In this case, in the information compression means 4, the trajectory grouping part 401 approximates the shape information and color information using a certain function for the individual trajectories of the layered feature trajectory information. This shape information is for example approximated by a third-order polynomial as explained above, for example, and the texture and color information is approximated by a fractal function (self similarity model) for example. The parameter estimation part 403 finds the parameters of the approximation functions of the shape information and color and texture information of each group. A bit assignment part 404 assigns a bit for the parameter values. This thereby enables compression coding.

Figure 19:
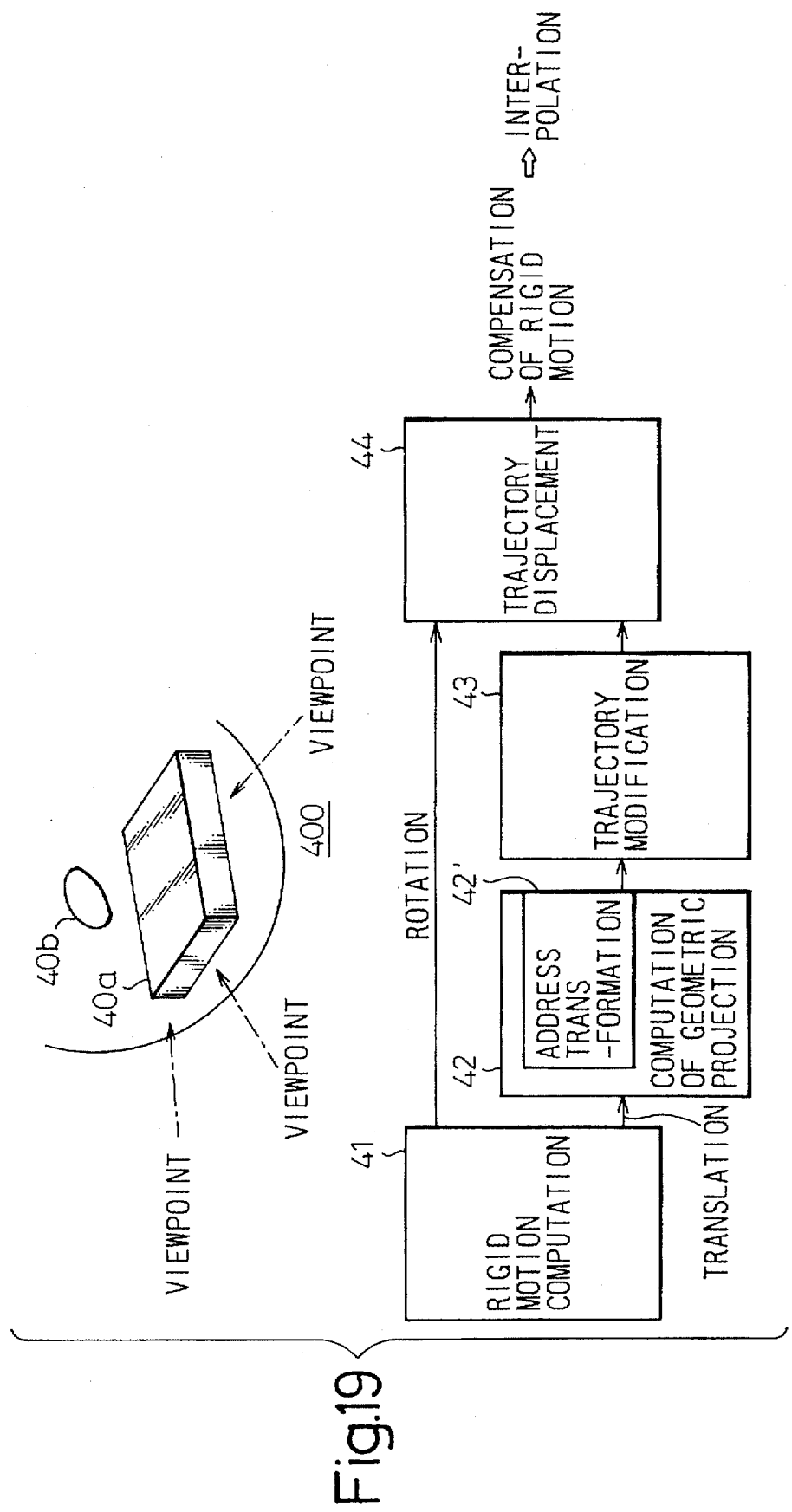
FIG. 19 is a view explaining compensation of rigid motion.

FIG. 19 is a view explaining the compensation of rigid motion. In the motion compensation unit 400, when the 3-D objects 40a and 40b are rigid bodies, their motion is computed by the rigid motion computation means 41. Based on the amount of motion of the translation of the rigid motion, the geometric projection between a viewpoint and the center of the rigid motion object is found by the geometric projection computation means 42. The trajectory modification means 43 includes a transformation means for transforming addresses based on the geometric projection of the viewpoint and modifies the layered feature trajectory information based on the transformed addresses. Further, based on the amount of motion of the rotation of the rigid motion, a trajectory displacement means 44 displaces the layered feature trajectory information modified by the trajectory modification means 43. This enables compensation of the rigid motion.

Figure 20:
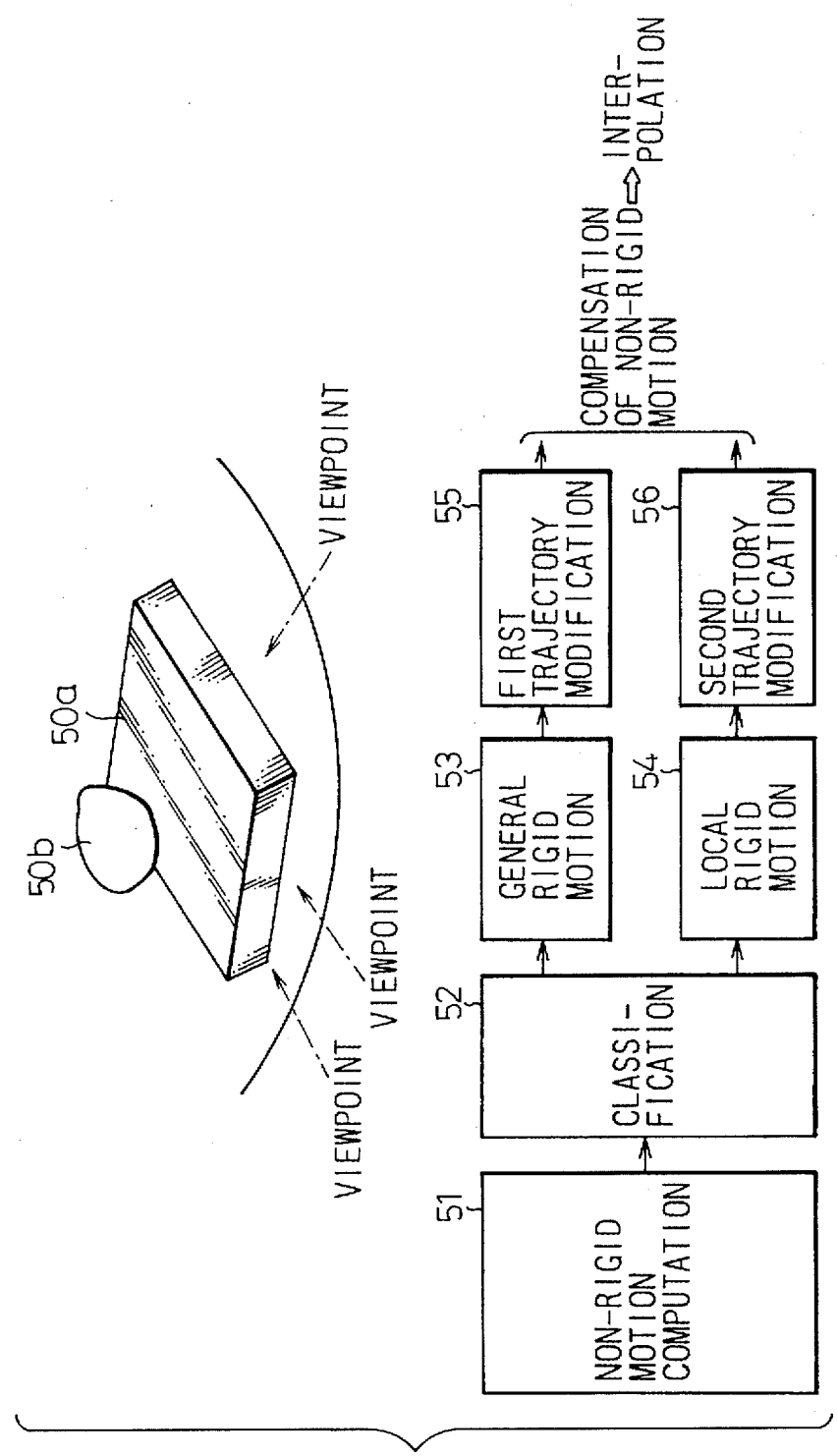
FIG. 20 is a view explaining compensation of non-rigid motion.

FIG. 20 is a view explaining compensation of non-rigid motion. In the motion compensation unit 500, when the 3-D objects 50a and 50b are non-rigid bodies, their motion is computed by the non-rigid motion computation means 51. The non-rigid motion is classified by the classification means 52 into general rigid motion 53 and local rigid motion 54. In accordance with the amount of motion of the general rigid motion 53, the first modification means 55 (corresponding to FIG. 19) modifies the layered feature trajectory information overall. In accordance with the amount of motion of the local rigid motion 54, the second modification means 56 (corresponding to FIG. 19) modifies the layered feature trajectory information partially. This enables compensation of non-rigid motion.

Accordingly, for moving images, by judging if the object is engaged in rigid motion or non-rigid motion, finding the amount of motion of the object, and modifying the layered feature trajectory information in accordance with that amount of motion, it is possible to compensate for the motion of the object.

If assuming that a 2-D image is a projection of a 3-D object and that the 3-D position of the 3-D object in the image in the camera coordinate system in the next frame is $Pc=(pc_x, pc_y, pc_z)$, then the 2-D position in the 2-D coordinate system corresponding to this can be expressed as $Pi=(pi_x, pi_y)=(pc_x/pc_z, pc_y/pc_z)$. If this is done, then the 2-D motion vector $y=(u, v)$ is expressed by the following equation using $j=N$ ($N=1, 2, 3, \ldots$)

$$y_j(k) = \gamma_j(k) t_c(k) \Omega_j(k) \omega_c(k) \quad (4)$$

where, $$\gamma_j(k) = \frac{1}{Pcz_j(k)} \begin{bmatrix} -1 & 0 & Pix_j(k) \\ 0 & -1 & Piy_j(k) \end{bmatrix}$$

$$\Omega_j(k) = \begin{bmatrix} Pix_j(k)Piy_j(k) & -(P^2iy_j(k)+1) & Piy_j(k) \\ (P^2iy_j(k)+1) & -Pix_j(k)Piy_j(k) & -Pix_j(k) \end{bmatrix}$$

$$t_c = [t_{cx}, t_{cy}, t_{cz}]^T$$
$$\omega_c = [\omega_{cx}, \omega_{cy}, \omega_{cz}]^T$$

k is time, $t_C$ is translation, $\omega_C$ is rotation, $\omega_C(k)$ is a rotational vector, and $P(k)$ are coordinates, $$y(k) = \begin{pmatrix} y_1(k) \\ \cdot \\ \cdot \\ \cdot \\ y_N(k) \end{pmatrix} = h(x(k)) = \eta(k) \quad (5)$$

where, $y(k)$ is an optical flow (velocity on the image)

The $\eta(k)$ at the right side of equation (5) is the stationary white noise process and can be modeled as the sum of two independent Gaussian white noises. On the one hand, there is measured noise, and on the other hand, there is the noise potentially held by the system. The state vector of the extended Kalman filter is comprised of the six 3-D moving parameters (translation and rotation of rigid body) and the 3-D structural parameters $P_C(k)$ of the N number of characteristic points.

$$x(k) = (t_c^T(k), \omega_c^T(k), PC_1(k), \ldots, PC_N(k))^T \quad (6)$$

The state vector $x(k)$ of equation (6) is updated by the following equation by the non-linear function f:

$$x(k+1) = f(x(k)) + \xi(K) \quad (7)$$

$$Pc_j(K+1) = \begin{pmatrix} 1 & -\omega_z(k+1) & \omega_y(k+1) \\ \omega_z(k+1) & 1 & -\omega_x(k+1) \\ -\omega_y(k+1) & \omega_x(k+1) & 1 \end{pmatrix} \cdot \begin{pmatrix} Pcx(k) \\ Pcy(k) \\ Pcz(k) \end{pmatrix} + t_c(k+1)$$

$$t_c(k+1) = t_c(k)$$
$$\omega_c(k+1) = \omega_c(k)$$

where, $\xi(k)$ indicates white noise.

The rotational motion of a 3-D object about a starting point of a frame centered on a 3-D object can be found directly using quaternions. Assuming that the frame centered on the 3-D object at $t_0$ and the frame centered on the first camera are on a straight line, the rotation matrix $R_{CO}$ relating to the frame centered on the 3-D object is expressed by the following equation using the four-dimensional column vector quaternions $q_{CO}(k) = (q_1, q_2, q_3, q_4)$:

$$R_{co}(q_{co}) = \begin{pmatrix} q_1^2 - q_2^2 - q_3^2 + q_4^2 & 2(q_1q_2 + q_3q_4) & 2(q_1q_3 - q_2q_4) \\ 2(q_1q_2 - q_3q_4) & -q_1^2 + q_2^2 - q_3^2 + q_4^2 & 2(q_2q_3 + q_1q_4) \\ 2(q_1q_3 + q_2q_4) & 2(q_2q_3 - q_1q_4) & -q_1^2 - q_2^2 + q_3^2 + q_4^2 \end{pmatrix} \quad (8)$$

If it is assumed that the $\omega_C(k)$ in equation (8) is constant between the k-th frame and the (k-1)th frame, then the quaternions can be expressed by the following equation using $\omega_C(k)$:

$$q_{co}(k) = \begin{pmatrix} \omega_x(k)\sin(|\omega(k)|k/2) \\ \omega_y(k)\sin(|\omega(k)|k/2) \\ \omega_z(k)\sin(|\omega(k)|k/2) \\ \cos(|\omega(k)|k/2) \end{pmatrix} \quad (9)$$

After updating x(k) in accordance with the abovementioned equation (7), the rotation vector $\omega_C(k)$ is derived by calculating the rotation matrix. The assumption that the $\omega_C(k)$ is constant between the k-th frame and the (k-1)th frame is the same as making a "zero-order" approximation, that is, making an approximation by omitting the terms remaining after the first order ones in the Taylor series. By doing this, it is possible to easily derive the equation of state at the time when the rotational motion of a 3-D object is not constant in speed or when not constant translation.

Summarizing the estimation of the rigid motion and 3-D structure of the object concerned (3-D object), 1. A set of features is selected for the object and the coordinates Pi(k) at the initial images of the same are automatically or manually designated and extracted.

2. The optical flow y(k) of the features between the frames is calculated.

3. The 3-D transformation vector $t_C(k)$ and rotation vector $\omega_C(k)$ between frames are calculated and equations (5) and (7) are resolved using an extended Kalman filter so as to update the 3-D structure parameters $P_C(k)$.

4. From $\omega_C(k)$, the four-dimensional column vector quaternions $q_{CO}(k)$ are calculated using equation (9).

5. From the four-dimensional column vector quaternions $q_{CO}(k)$, the rotation matrix $R_{CO}(k)$ is calculated using equation (8).

When selecting the features of an object for tracking the object, the features selected are not the features which do not move during ambiguous motion, but which move as a result of well-defined motion. The real image is divided into the object and background and the features are detected from the region of the object as maximum curvatures, end points, or corners. The features in this case may be detected simply by humans and also may be detected using computer processing.

The track of the features may be calculated by the optical flow method. There are two main methods for this. One entails block matching based on the normalized cross correlation. According to this, for example, the best tracking precision is obtained when using 8×8 blocks and setting the retrieval range to ±10 pixels. The other is the gradient method. It calculates the linear differential from four points and enables estimation of the velocity of a 5×5 block using the least square method.

The initial values of the Kalman filter are set as follows: For the state vector, six 3-D motion parameters are set to 0, structural parameters are set, and the covariance matrix of the expected error is set to 0. When the optical flow is calculated by the gradient method, the covariance matrix of the measured error is updated, but when use is made of the block matching, the covariance matrix is updated as a steady-state, zero-mean Gaussian distribution.

Further, if assuming that an object moves while the viewpoint remains fixed, then the properties of the amount of motion of the viewpoint are deemed equivalent to the properties of the amount of motion of rigid motion. Therefore, it is possible to compensate for the rigid motion by an image interpolation means. That is, 1. The geometric projection between the viewpoint and the center of the object is found from the amount of motion of the translation $t_C$.

2. Address transformation is performed by the geometric projection from the viewpoint.

3. Layered feature trajectory information is modified by the address transformation.

4. The modified layered feature trajectory information is moved by the amount of motion of the rotation $\omega_C$ or $R_{CO}$.

Figure 21:
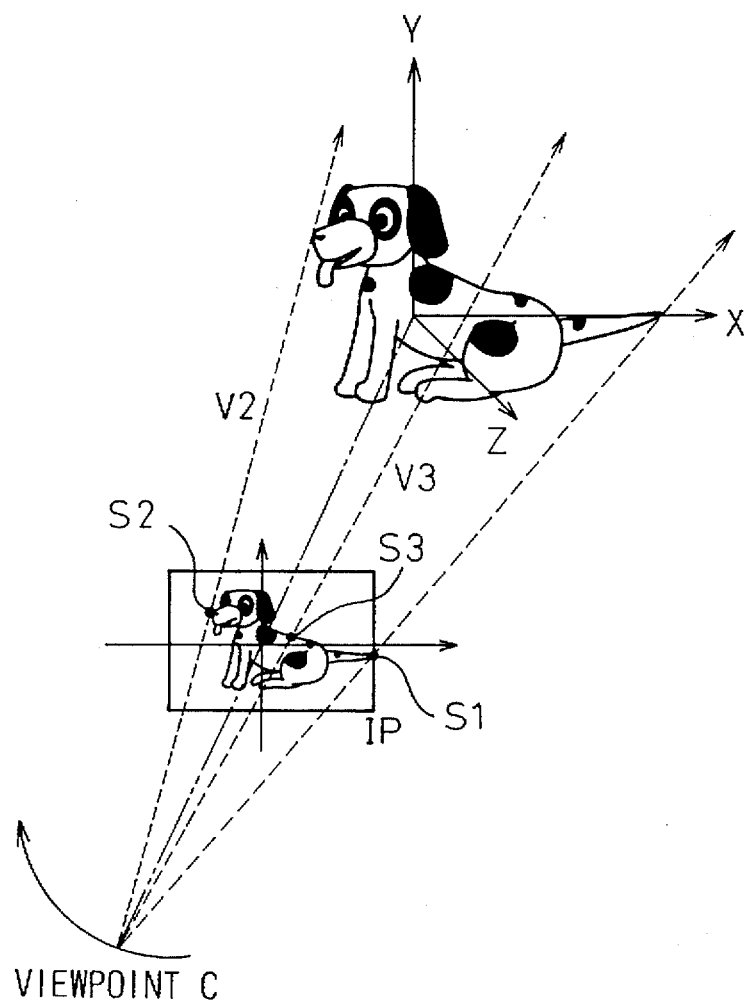
FIG. 21 is a view explaining the perspective geometric projection of 3-D multiple-view images.

FIG. 21 is a view explaining the perspective geometric projection of 3-D multiple-view images. When the distance between the viewpoint C and the center of the 3-D object differs from the distance at the time of acquiring the 3-D multiple-view images of the 3-D object, perspective projections of the lines of sight V1, V2, and V3 from the viewpoint C passing through the points S1, S2, and S3 on the image plane (IP) are found. The addresses expressing positions in the image are transformed by the geometric projection from the viewpoint C and layered feature trajectory information is modified by the transformed addresses. In this case, when the distance between the viewpoint C and the center of the 3-D object is short, the image is enlarged by the address transformation. Further, when the distance between the viewpoint C and the center of the 3-D object is long, the image is reduced by the address transformation.

FIG. 22 is a view explaining the image interpolation means 3. In the figure, (a) is the coded layered feature trajectory information stored in the memory means 6. This includes locations, shape, color, texture information, and front-back visibility relationship of aspects. The shape, texture and color information are approximated by approximation functions. Further, the relative relationship is expressed by identifiers etc. Accordingly, the trajectories a21' and a22' of the layered feature trajectory information shown in (b) and the overlapped regions a23a and a23b (see FIG. 8) showing the relative relationship are obtained, and the trajectories a21 and a22 shown in (c) are obtained by the identifiers showing the relative relationship.

The trajectories a21 and a22 show the aspects of the 3-D object, so when the directions by which the 3-D object is viewed differ, the shapes of the trajectories a21 and a22 differ. Accordingly, interpolation is performed on the trajectories a21 and a22 in accordance with the viewpoint designated by the user. That is, the trajectories a21 and a22 of (c) become for example the trajectories a21A and a22A shown in (d). By performing this interpolation, the group of trajectories shown in (e) is obtained, so it is possible to render an image of the 3-D object from the group of trajectories in the directions u and w of the position corresponding to the input viewpoint on the parallax axis θ. That is, even when a viewpoint is designated differing from the image acquisition position obtained by the image acquisition means 1 for acquiring 3-D multiple-view images at (f), it is possible to render an image (f) of the original 3-D object from the group of trajectories shown in (e).

Figure 23:
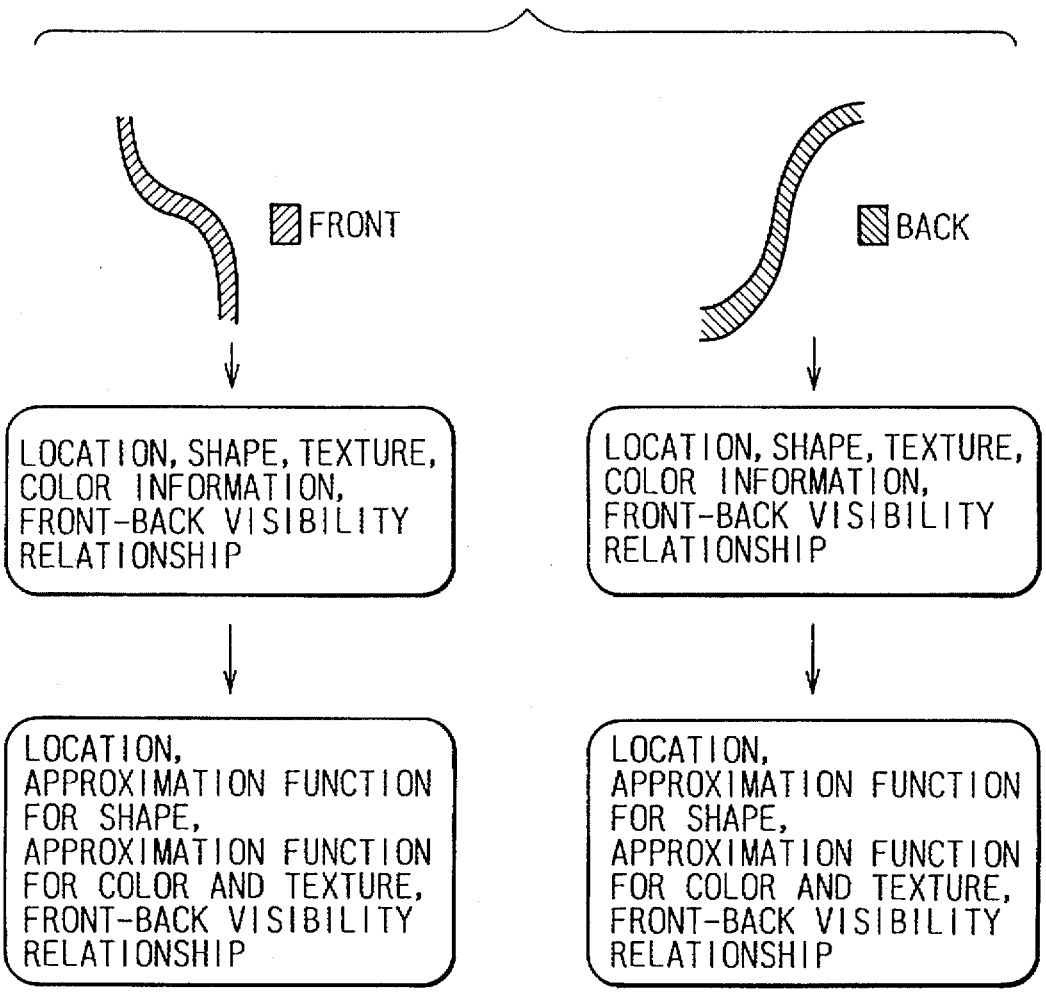
FIG. 23 is a view explaining an information compression means.

FIG. 23 is a view explaining the information compression means. In the same way as with the explanation of (e) of FIG. 3, layered feature trajectory information is input from the image analysis means 2 to the information compression means 4, the location, shape, texture, color information, and front-back visibility relationship of aspects are found for the individual trajectories in the layered feature trajectory information as shown by the processing process shown by the arrow, the location, shape approximation function, texture, color information approximation function, and front-back visibility relationship of the aspects are used as the coded layered feature trajectory information, compression coding is performed by removing the redundancy of layered feature trajectory information, and the result is stored in the memory means 6.

Figure 24:
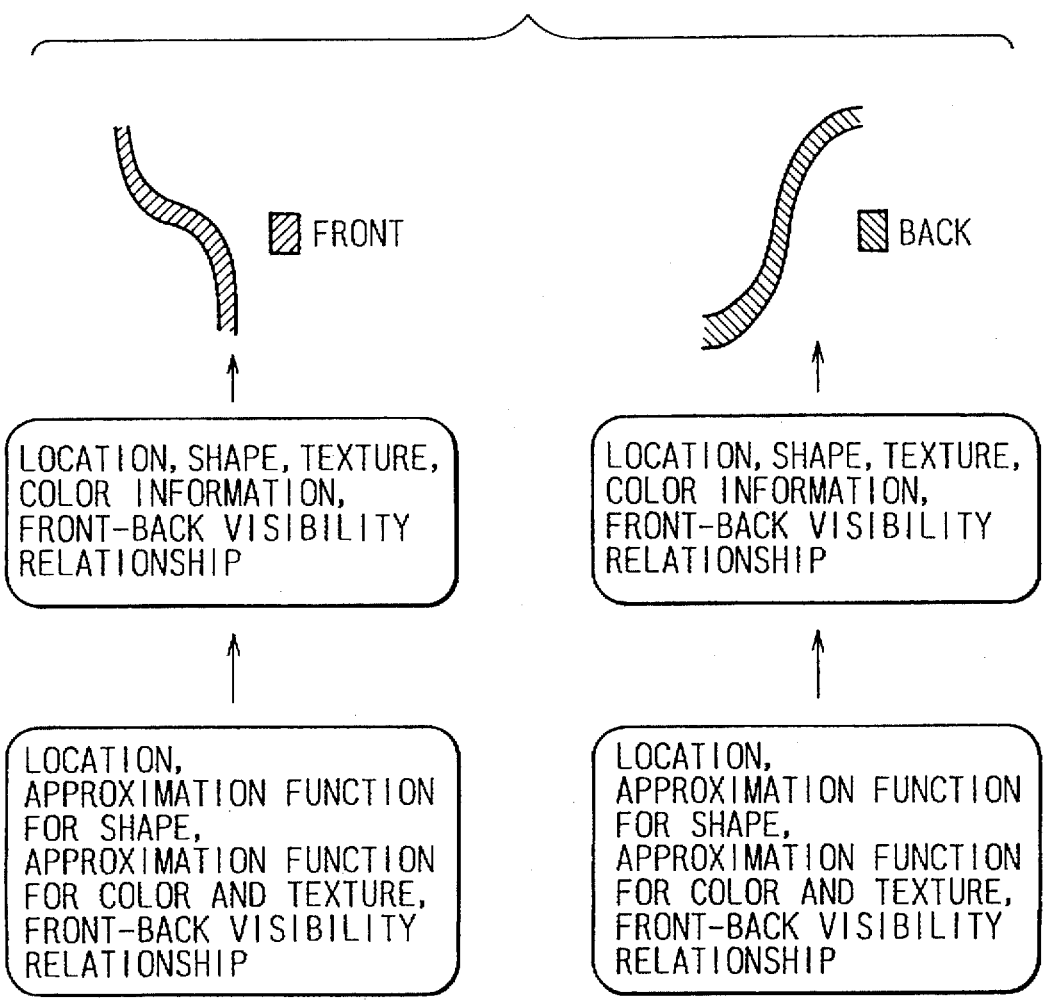
FIG. 24 is a view explaining an image reconstruction means.

FIG. 24 is a view explaining the information reconstruction means. As shown by the processing process shown by the arrows, processing reverse to the processing of the information compression means 4 shown in FIG. 23 is used to successively reconstruct the coded layered feature trajectory information (location, shape approximation function, texture, color information approximation function, front-back visibility relationship of aspects) read out from the memory means 6 and thereby to obtain the original layered feature trajectory information.

When the layered feature trajectory information is obtained, as explained with reference to FIG. 22, the trajectories are modified in accordance with the input viewpoint to enable rendering of the image corresponding to the input viewpoint based on this. In this case, the image of the 3-D object is interpolated, but the image information does not need to include the 3-D structure, so the computations can be remarkably reduced compared with the related art.

As explained above, the present invention acquires 3-D multiple-view images comprised of sets of images of a 3-D object as seen from a plurality of viewpoints, finds the layered feature trajectory information from the images of the 3-D multiple-view images, and renders an image of the 3-D object as seen from any arbitrary viewpoint by interpolation using the layered feature trajectory information. It does not need to use 3-D structure information as in the related art and can render an image of the 3-D object from any arbitrary viewpoint by using 2-D structure information. Further, the amount of computation becomes substantially constant regardless of the complexity of a scene and redundancy is eliminated by compression coding the layered feature trajectory information, so the requisite storage capacity can be reduced as well. Accordingly, there is the advantage of enabling processing of 3-D multiple-view images economically and at a high speed.

When acquiring a series of images of a 3-D object as seen from a plurality of viewpoints along a plurality of curves, by analyzing the layered feature trajectory information, establishing correspondence between the sets of trajectories, calculating the amount of motion between the sets of trajectories, and calculating the amount of modification of the layered feature trajectory information based on the geometric projection from the viewpoints, it is possible to easily render an image of the 3-D object from any arbitrary viewpoint by interpolation. Also, even when the 3-D object is in motion, by finding the amount of motion, it is possible to easily render an image of the 3-D object.

We claim:

1. A method of processing 3-D multiple-view images comprising:

acquiring by an image acquisition means, 3-D multiple-view images comprised of a group of images obtained by viewing a 3-D object from a plurality of viewpoints;

finding by an image analysis means, layered feature trajectory information connecting identical points of the 3-D object between images of the 3-D multiple-view images obtained by the image acquisition means; and finding by interpolation by an image interpolation means, an image of the 3-D object viewed from any arbitrary viewpoint based on the layered feature trajectory information.

2. A method of processing 3-D multiple-view images as set forth in claim 1, which further comprises compression coding, by an image compression means, the layered feature trajectory information obtained by the image analysis means, storing the compression coded layered feature trajectory information in a memory means, decoding the compression coded layered feature trajectory information read out from the memory means, reconstructing the original layered feature trajectory information by an information reconstruction means, and inputting the same to the image interpolation means.

3. An apparatus for processing 3-D multiple-view images comprising:

an image acquisition means acquiring 3-D multiple-view images comprised of a group of images obtained by viewing a 3-D object from a plurality of viewpoints;

an image analysis means finding the layered feature trajectory information connecting identical points of the 3-D object between images of the 3-D multiple-view images obtained by the image acquisition means; and an image interpolation means finding by interpolation an image of the 3-D object viewed from any arbitrary viewpoint based on the layered feature trajectory information obtained by the image analysis means.

4. An apparatus for processing 3-D multiple-view images as set forth in claim 3, wherein said image acquisition means is configured to acquire images of said 3-D object seen from a plurality of viewpoints along each of a plurality of curves.

5. An apparatus for processing 3-D multiple-view images as set forth in claim 3, wherein said image acquisition means is configured to acquire images of said 3-D object seen from a plurality of viewpoints along a plurality of curves formed on a curved surface surrounding at least part of said 3-D object.

6. An apparatus for processing 3-D multiple-view images as set forth in claim 3, which interpolates the layered feature trajectory information at any arbitrary height based on a designated viewpoint based on the amount of modification of said feature trajectory information found by said image analysis means and produces a 3-D image from said viewpoint based on the results of the interpolation.

7. An apparatus for processing 3-D multiple-view images as set forth in claim 3, wherein said image reconstruction means reconstructs the shape and color and texture information of a trajectory based on data read from a memory means so as to reconstruct the layered feature trajectory information.

8. An apparatus for processing 3-D multiple-view images as set forth in claim 3, further comprising:

an image compression means compression coding said layered feature trajectory information obtained by said image analysis means;

a memory means storing the layered feature trajectory information coded by said information compression means; and an information reconstruction means reading out and decoding said coded layer feature trajectory information stored in said memory means and inputting it to said image interpolation means.

9. An apparatus for processing 3-D multiple-view images as set forth in claim 8, further comprising an information compression part compression coding the layered feature trajectory information obtained by said image analysis means, the information compression part comprising a trajectory grouping part grouping the individual trajectories of the layered feature trajectory information, an approximation part approximating the shape and texture information of the same, a parameter estimation means finding parameters of the approximation functions of the shape and texture information of the groups formed, and a bit assignment means assigning bits for the parameters.

10. An apparatus for processing 3-D multiple-view images as set forth in claim 8, wherein said image reconstruction means reconstructs the shape and color and texture information of a trajectory based on data read from a memory means so as to reconstruct the layered feature trajectory information.

11. An apparatus for processing 3-D multiple-view images as set forth in claim 3, wherein said image analysis means establishes correspondence for the groups of trajectories of said 3-D multiple-view images acquired along said plurality of curves based on geometric invariance or color and texture invariance, finds the amount of motion among groups of trajectories, and finds the amount of modification of said layered feature trajectory information based on said amount of motion and a geometric projection of said viewpoint.

12. An apparatus for processing 3-D multiple-view images as set forth in claim 11, which interpolates the layered feature trajectory information at any arbitrary height based on a designated viewpoint based on the amount of modification of said feature trajectory information found by said image analysis means and produces a 3-D image from said viewpoint based on the results of the interpolation.

13. An apparatus for processing 3-D multiple-view images as set forth in claim 3, wherein said image analysis means comprises a motion compensation unit which finds the amount of motion of an object engaged in rigid motion or non-rigid motion in said 3-D multiple-view images and changes said layered feature trajectory information based on said amount of motion.

14. An apparatus for processing 3-D multiple-view images as set forth in claim 13, wherein said motion compensation unit is provided with a geometric projection part for finding the geometric projection between a viewpoint and the center of an object in rigid motion based on the amount of translation in the rigid motion, an address transformation part for transforming the addresses by the geometric projection from the viewpoint, a trajectory modification part for modifying the layered feature trajectory information based on the addresses transformed by the address transformation part, and a displacement part for displacing the layered feature trajectory information modified by said modification part.

15. An apparatus for processing 3-D multiple-view images as set forth in claim 13, wherein said motion compensation unit comprises a classification means classifying non-rigid motion into general rigid motion and local rigid motion, a first modification means modifying the layered feature trajectory information overall by the amount of motion of the general rigid motion according to said classification means, and a second modification means modifying the layered feature trajectory information partially by the amount of motion of said local rigid motion according to said classification means.

16. An apparatus for processing 3-D multiple-view images as set forth in claim 3, wherein said image interpolation means comprises a geometric projection part finding geometric projections according to viewpoints, an address transformation part transforming the addresses based on the geometric projections of the geometric projection part, a trajectory modification part modifying said layered feature trajectory information based on the addresses according to the address transformation part, a visibility determination part determining the relative relationship of the overlapped regions caused by said geometric projections, a trajectory synthesis part synthesizing the layered feature trajectory information corresponding to the 3-D multiple-view images, a reconstruction part reconstructing the 3-D multiple-view images based on said layered feature trajectory information, and an image rendering part rendering an image from a designated viewpoint based on said 3-D multiple-view images.

17. An apparatus for processing 3-D multiple-view images as set forth in claim 16, wherein said address transformation part in said image interpolation means enlarges or reduces the image rendered with respect to said designated viewpoint when the distance between the designated viewpoint and the center of the 3-D object differs from the distance at the time of acquiring the 3-D multiple-view images.

18. An apparatus for processing 3-D multiple-view images as set forth in claim 3, further comprising:

an information compression part compression coding the layered feature trajectory information obtained by said image analysis means, the information compression part comprising a trajectory grouping part grouping the individual trajectories of the layered feature trajectory information, an approximation part approximating the shape and texture information of the same, a parameter estimation means finding parameters of the approximation functions of the shape and texture information of the groups formed, and a bit assignment means assigning bits for the parameters.

19. An apparatus for processing 3-D multiple-view images as set forth in claim 18, wherein said information compression means uses a polynomial as the approximation function of said shape information.

20. An apparatus for processing 3-D multiple-view images as set forth in claim 18, wherein said information compression means uses a fractal function as the approximation function of said color and texture information.

21. An apparatus for processing 3-D multiple-view images as set forth in claim 3, wherein said image analysis means includes a feature trajectory formation part finding groups of trajectories connecting identical points of said 3-D object among the images of said 3-D multiple-view images, an overlapped region classification part detecting the overlapped regions of said feature trajectories and classifying the relative relationship of said overlapped regions; a visibility determination part determining based on said groups of trajectories the visibility due to holes or concavities in said 3-D object, a part extracting the coordinates, shape, texture, color information, and other features of said groups of trajectories, and a part outputting the information obtained by the above means as a layered representation of feature trajectories.

22. An apparatus for processing 3-D multiple-view images as set forth in claim 21, which interpolates the layered feature trajectory information at any arbitrary height based on a designated viewpoint based on the amount of modification of said feature trajectory information found by said image analysis means and produces a 3-D image from said viewpoint based on the results of the interpolation.

23. An apparatus for processing 3-D multiple-view images as set forth in claim 21, wherein the visibility determination part determining the visibility at holes or concavities in said 3-D object in said image analysis means performs control so as to acquire an image of said 3-D object seen at finer intervals from said image acquisition means for the nonvisible portions.

24. An apparatus for processing 3-D multiple-view images as set forth in claim 21, wherein said overlapped region classification part in said image analysis means detecting overlapped regions of said groups of trajectories and classifying the front-back visibility relationships of the overlapped regions comprises a segmentation part identifying points of discontinuity based on said groups of trajectories and segmenting the image into regions based on said points of discontinuity, a labeling part labeling the regions showing identical portions of said 3-D object from the segmented regions, a merging part merging labeled regions, and a visibility ordering part determining the relative relationship between the merging portions according to said merging part and the merging portions of other regions and adding identifiers.

25. An apparatus for processing 3-D multiple-view images as set forth in claim 21, wherein said overlapped region classification part in said image analysis means detecting overlapped regions of said groups of trajectories and classifying the relative relationships of the overlapped regions comprises a segmentation part identifying points of discontinuity based on said groups of trajectories and segmenting the image into regions based on said points of discontinuity, a labeling part labeling the regions showing identical portions of said 3-D object from the segmented regions, a merging part merging labeled regions, and a visibility ordering part determining the relative relationship between the merging portions according to said merging part and the merging portions of other regions and adding identifiers.

26. An apparatus for processing 3-D multiple-view images as set forth in claim 21, wherein said image analysis means establishes correspondence for the groups of trajectories of said 3-D multiple-view images acquired along said plurality of curves based on geometric invariance or color and texture invariance, finds the amount of motion among groups of trajectories, and finds the amount of modification of said layered feature trajectory information based on said amount of motion and a geometric projection of said viewpoint.

27. An apparatus for processing 3-D multiple-view images as set forth in claim 26, which interpolates the layered feature trajectory information at any arbitrary height based on a designated viewpoint based on the amount of modification of said feature trajectory information found by said image analysis means and produces a 3-D image from said viewpoint based on the results of the interpolation.

28. An apparatus for processing 3-D multiple-view images as set forth in claim 21, wherein said image analysis means comprises a motion compensation unit which finds the amount of motion of an object engaged in rigid motion or non-rigid motion in said 3-D multiple-view images and changes said layered feature trajectory information based on said amount of motion.

29. An apparatus for processing 3-D multiple-view images as set forth in claim 28, wherein said motion compensation unit comprises a geometric projection part finding the geometric projection between a viewpoint and the center of an object in rigid motion based on the amount of translation in the rigid motion, an address transformation part transforming the addresses by the geometric projection from the viewpoint, a trajectory modification part modifying the layered feature trajectory information based on the addresses transformed by the address transformation part, and a displacement part displacing the layered feature trajectory information modified by said modification part.

30. An apparatus for processing 3-D multiple-view images as set forth in claim 28, wherein said motion compensation unit is provided with a geometric projection part for finding the geometric projection between a viewpoint and the center of an object in rigid motion based on the amount of translation in the rigid motion, an address transformation part for transforming the addresses by the geometric projection from the viewpoint, a trajectory modification part for modifying the layered feature trajectory information based on the addresses transformed by the address transformation part, and a displacement part for displacing the layered feature trajectory information modified by said modification part.

31. An apparatus for processing 3-D multiple-view images as set forth in claim 28, wherein said motion compensation unit comprises a classification means classifying non-rigid motion into general rigid motion and local rigid motion, a first modification means modifying the layered feature trajectory information overall by the amount of motion of the general rigid motion according to said classification means, and a second modification means modifying the layered feature trajectory information partially by the amount of motion of said local rigid motion according to said classification means.

32. An apparatus for processing 3-D multiple-view images comprising:
  an image analysis means finding layered feature trajectory information connecting identical points of the 3-D object between images of the 3-D multiple-view images obtained by the image acquisition means; and
  an image interpolation means finding by interpolation an image of the 3-D object viewed from any arbitrary viewpoint based on the layered feature trajectory information obtained by the image analysis means.

* * * * *

UNITED STATES PATENT AND TRADEMARK OFFICE
CERTIFICATE OF CORRECTION

PATENT NO. : 5,710,875
DATED : Jan. 20, 1998
INVENTOR(S) : HARASHIMA et al.

It is certified that error appears in the above-identified patent and that said Letters Patent is hereby corrected as shown below:

Drawings:
Sheet 1 of 25, Fig. 1A, block 1, change "ACQUSITION" to --ACQUISITION--.

Col. 4, line 25, change "mans" to --means--.

Col. 15, line 17 (Equation (9), line 4)), change "cos(|$\omega$(k)|k/2)" to --cos(|$\omega$(k)|/k/2)--.

Col. 19, line 52 (Claim 14, line 3), change "is provided with" to --comprises--;
line 53 (Claim 14, line 4), after "part" delete "for";
line 56 (Claim 14, line 7), after "part" delete "for";
line 58 (Claim 14, line 9), after "part" delete "for";
line 60 (Claim 14, line 11), after "part" delete "for".

Col. 22, line 25 (Claim 30, line 3), change "is provided with" to --comprises--.

Signed and Sealed this

Second Day of June, 1998

Attest:

BRUCE LEHMAN

Attesting Officer

Commissioner of Patents and Trademarks